United States Patent
Hirano et al.

(10) Patent No.: US 6,814,556 B2
(45) Date of Patent: Nov. 9, 2004

(54) RESIN MOLDING MACHINE AND RESIN TABLET FEEDING MACHINE

(75) Inventors: Junji Hirano, Nagano (JP); Tsutomu Miyagawa, Nagano (JP); Tomio Katsuie, Nagano (JP); Yasuhiko Miyashita, Nagano (JP)

(73) Assignee: Apic Yamada Corporation, Nagano (JP)

( * ) Notice: Subject to any disclaimer, the term of this patent is extended or adjusted under 35 U.S.C. 154(b) by 360 days.

(21) Appl. No.: 09/838,240

(22) Filed: Apr. 20, 2001

(65) Prior Publication Data

US 2001/0033876 A1 Oct. 25, 2001

(30) Foreign Application Priority Data

| Apr. 21, 2000 | (JP) | 2000-120997 |
| Apr. 21, 2000 | (JP) | 2000-121017 |
| Apr. 24, 2000 | (JP) | 2000-122911 |

(51) Int. Cl.[7] .......... B29C 33/68; B29C 45/14; B29C 45/42; B29C 31/04
(52) U.S. Cl. .......... 425/89; 425/116; 425/126.1; 425/182; 425/190
(58) Field of Search .......... 425/89, 116, 126.1, 425/182, 190

(56) References Cited

U.S. PATENT DOCUMENTS

| 3,797,103 A | * | 3/1974 | Desmond et al. | 29/856 |
| 5,654,017 A | * | 8/1997 | Harmsen | 425/116 |
| 5,891,483 A | * | 4/1999 | Miyajima | 425/89 |
| 6,007,316 A | * | 12/1999 | Bandoh | 425/116 |
| 6,050,802 A | * | 4/2000 | Kobayashi | 425/116 |
| 6,350,113 B1 | * | 2/2002 | Miyajima | 425/89 |

FOREIGN PATENT DOCUMENTS

| JP | 01186638 A | * | 7/1989 | H01L/21/56 |
| JP | 3-286817 | | 12/1991 | |
| JP | 5-138681 | | 6/1993 | |
| JP | 6-166049 | | 6/1994 | |
| JP | 07032414 A | * | 2/1995 | B29C/45/14 |
| JP | 10-015994 | | 1/1998 | |
| JP | 10-058457 | | 3/1998 | |
| JP | 10092850 A | * | 4/1998 | H01L/21/56 |
| JP | 10113946 A | * | 5/1998 | B29C/45/02 |
| JP | 2000049175 A | * | 2/2000 | H01L/21/56 |

* cited by examiner

*Primary Examiner*—Robert B. Davis
(74) *Attorney, Agent, or Firm*—Birch, Stewart, Kolasch & Birch, LLP

(57) ABSTRACT

The resin molding machine is capable of executing many functions and easily expanding and modifying the structure. In the resin molding machine, a loader and an unloader are moved on common rail sections so as to convey a work piece and a molded product. An additional rail unit has a rail section, on which the loader and the unloader can be moved. The additional rail unit is detachably attached between a work piece feeding unit and a product accommodating unit. The common rail sections and the rail section of the additional rail unit are disconnectably connected.

18 Claims, 19 Drawing Sheets

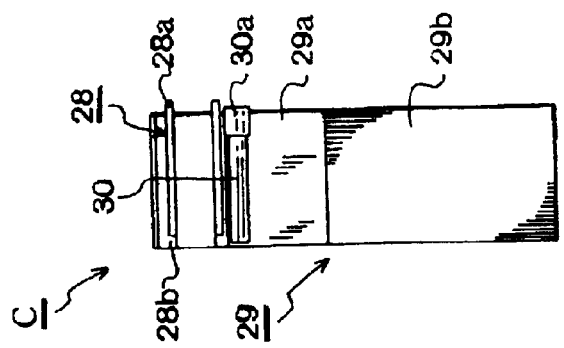
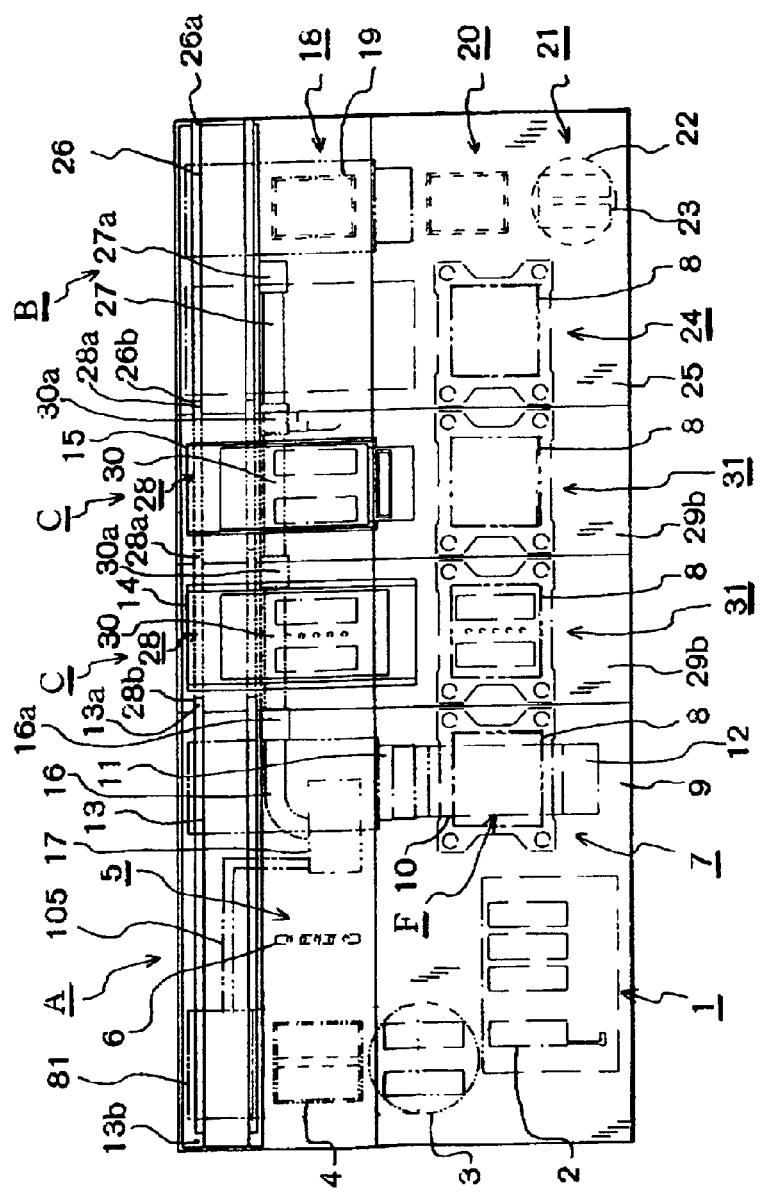

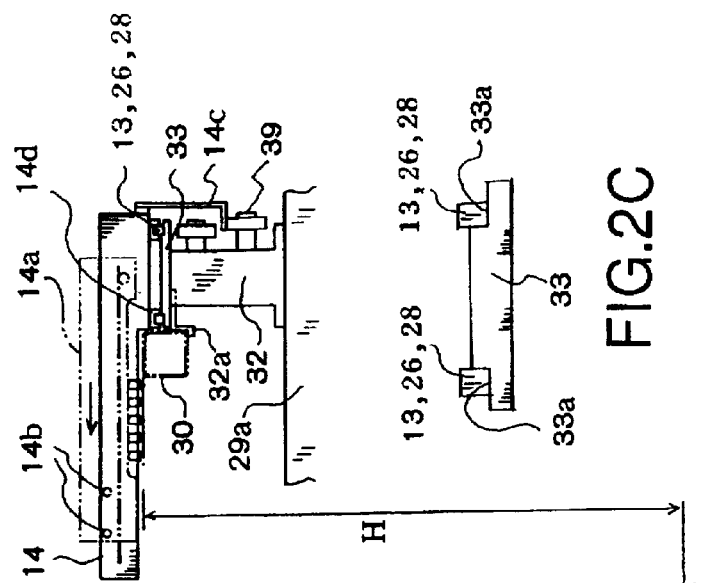
FIG.2B
FIG.2C
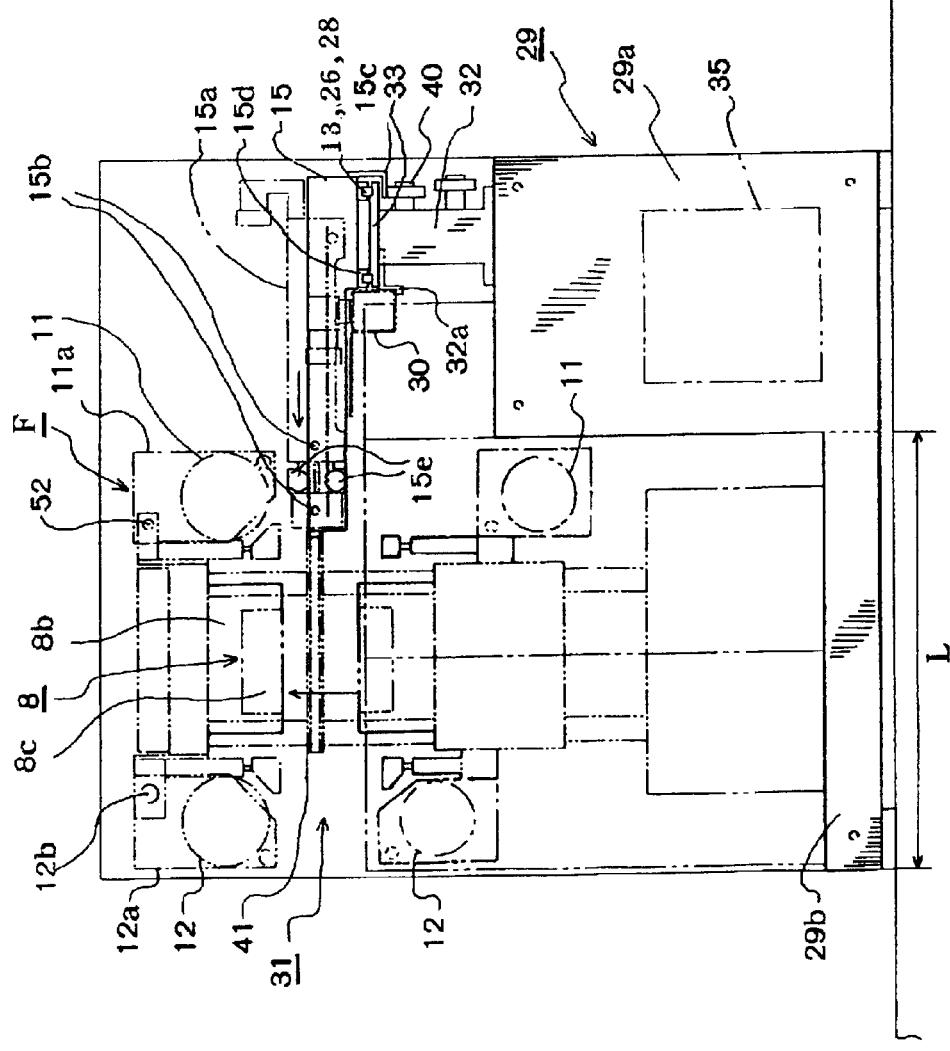
FIG.2A

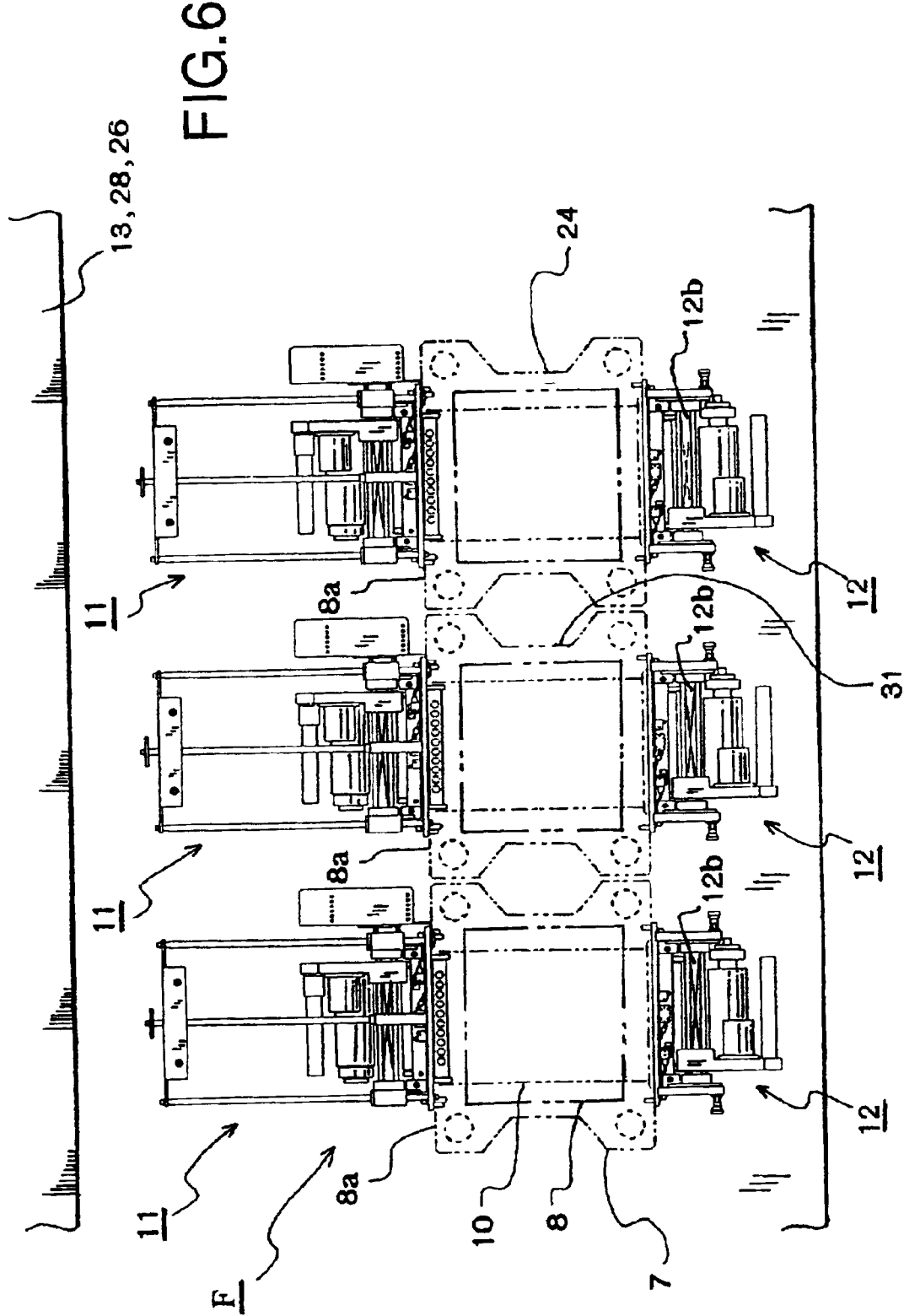

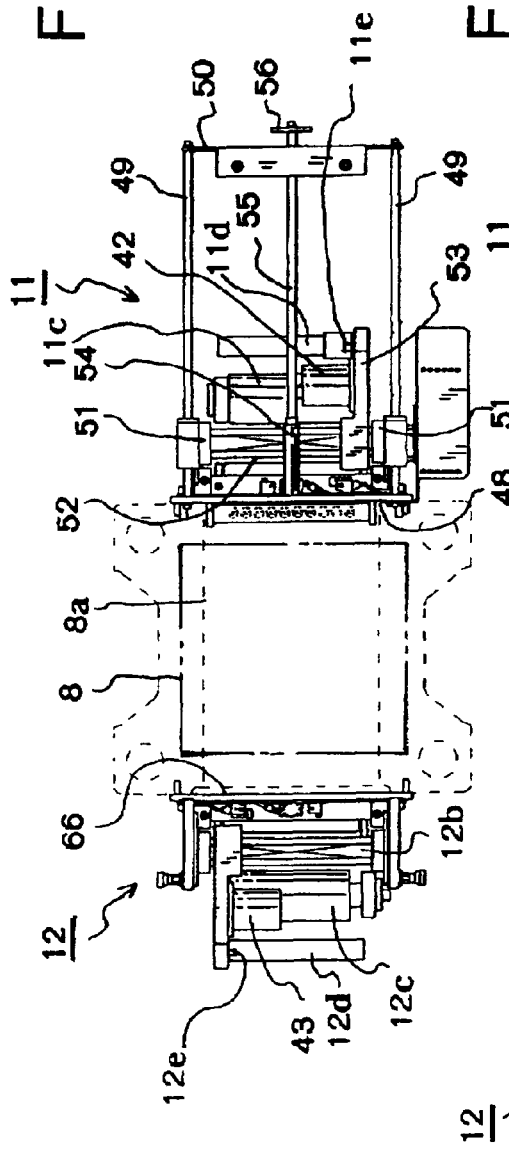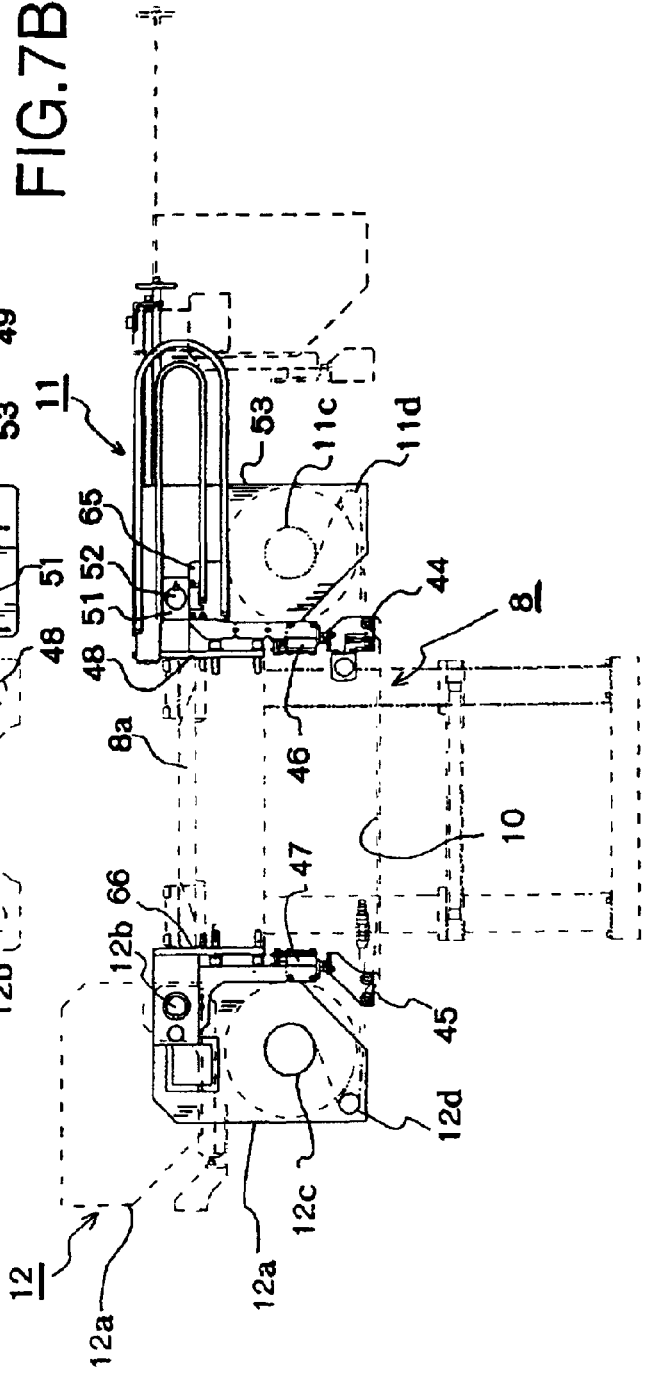

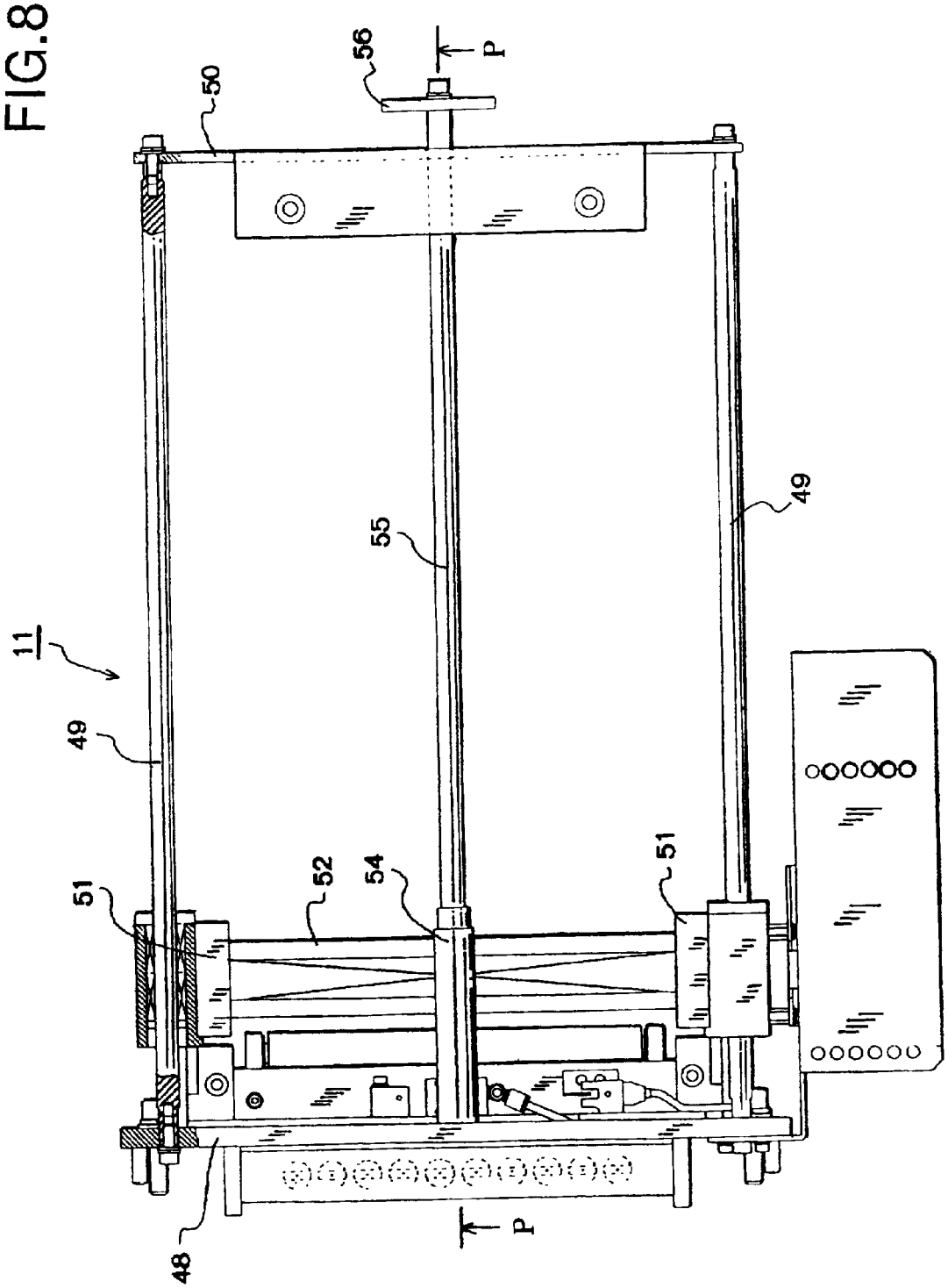

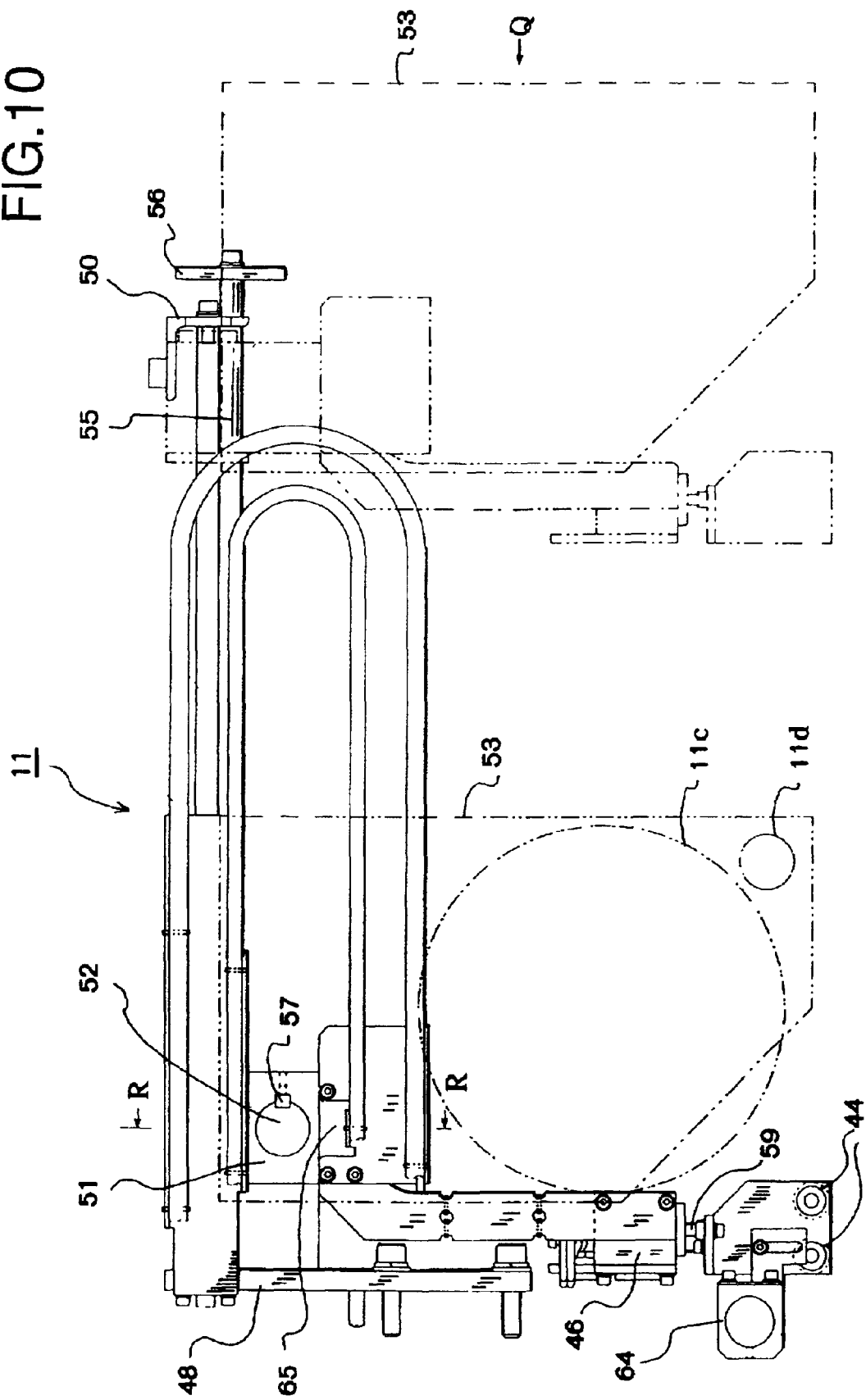

FIG.14
FIG.15
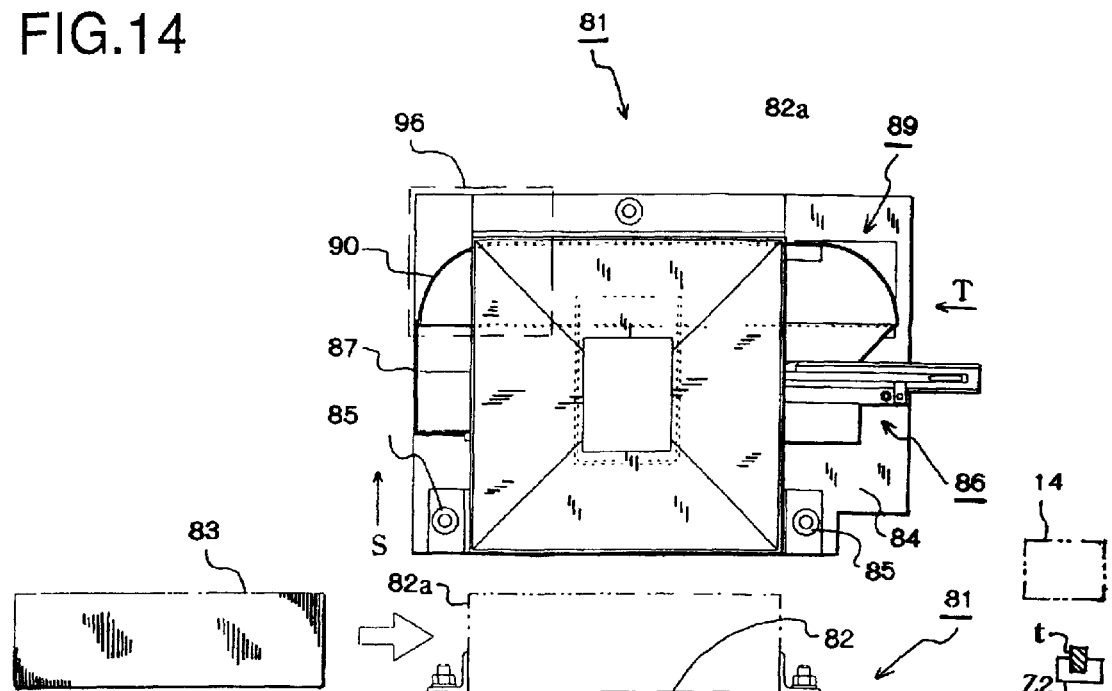
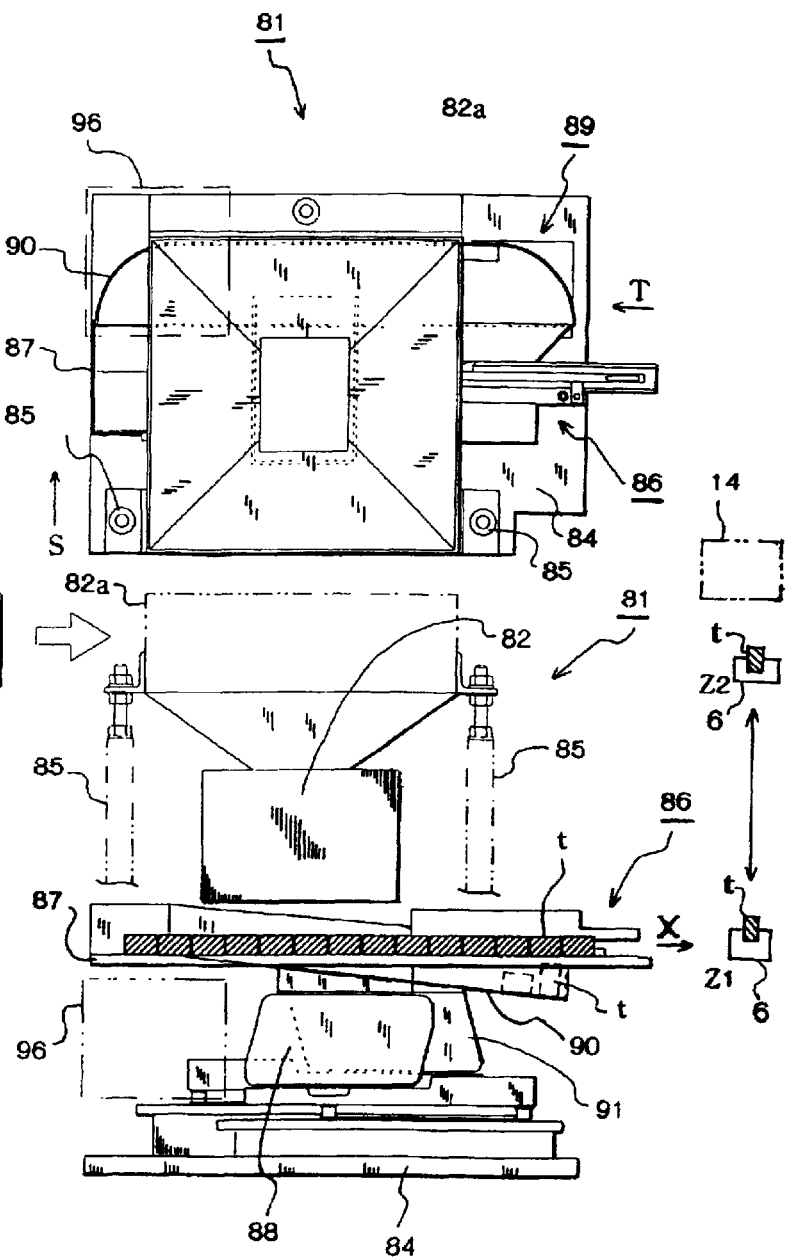

US 6,814,556 B2

RESIN MOLDING MACHINE AND RESIN TABLET FEEDING MACHINE

BACKGROUND OF THE INVENTION

The present invention relates to a resin molding machine, in which a loader conveys a work piece from a work piece feeding unit to a press unit and an unloader conveys a molded product from the press unit to a product accommodating unit, and a resin tablet feeding machine, in which sending resin tablets by vibrating a tablet container.

Conventional resin molding machines for molding semiconductor devices will be explained with reference to FIGS. 20 and 21. In FIG. 20, the conventional resin molding machine includes: a press unit 202 having a molding die 201; a work piece feeding unit 205 feeding work pieces, e.g., lead frames, substrates, accommodated in feeding magazines 203 to a feeding table 204; a storing unit 206 storing the resin tablets; a resin tablet feeding unit 210 having a bowl feeder 207 and a linear feeder 208, which form the resin tablets in line and feed in a prescribed direction, and feeding tablet holders 209, in which the resin tablets are respectively set, to the feeding table 204; a degating unit 211 removing disused resin from molded products, which are taken out from the molding die 201; a product accommodating unit 213 having accommodating magazines 212, in which the molded products, from which the disused resin is removed, are accommodated; and a control unit 214 controlling the whole machine.

When the work pieces and the resin tablets are supplied onto the feeding table 204, they are held by a loader 215 and conveyed to the molding die 201, which has been opened. On the other hand, when the molded products are ejected from the molding die 201, they are held by an unloader 216 and conveyed to the degating unit 211. At that time, the unloader 216 cleans parting faces of the molding die 201. The unloader 216 holds and presses substrates of the molded products, and they are cooled by air so as to prevent deformation of the substrates in the degating unit 211. In the degating unit 211, the substrates are twisted to remove the disused resin, so the unloader 216 leaves the molded products, from which the disused resin is removed, and returns to take out next products. The loader 215 and the uunloader 216 are moved along a common guide rail 217, which is provided above the press unit 202. Namely, the loader 215 is reciprocatively moved between the feeding table 204 and the molding die 201; the unloader 216 is reciprocatively moved between the molding die 201 and the degating unit 211. The conventional resin molding unit was disclosed in a Japanese Patent Gazette No. 3-286817.

In FIG. 21, the conventional resin molding machine has a plurality of press units 222a–222d, which respectively have molding dies 221a–221d, and they are detachably attached to attaching sections 224 of a base unit 223 so as to change number of products and kinds of products. The base unit 233 includes: a work piece feeding unit 227 feeding work pieces, e.g., lead frames, substrates, accommodated in feeding magazines 203 to a turn table 226; a resin tablet feeding unit 230 feeding the resin tablets from tablet cassettes 228 and setting the resin tablets in a tablet holder 229; a degating unit 232 removing disused resin from molded products, which are taken out from the press units 222a–222d and held by a pick-up 231; and a product accommodating unit 234 having accommodating magazines 233, in which the molded products, from which the disused resin is removed, are accommodated.

When the work pieces and the resin tablets are supplied into the molding dies 221a–221d, they are held by a loader 236 of a loader unit 235 and conveyed to the molding dies 221a–221d, which have been opened. On the other hand, when the molded products are ejected from the molding dies 221a–221d, they are held by an unloader 237 of the loader unit 235 and conveyed to the degating unit 232. At that time, the unloader 237 cleans parting faces of the molding dies 221a–221d. The loader 236 and the unloader 237 are vertically arranged in the loader unit 235 and moved along a common guide rail 238 of the base unit 223. The loader 236 and the unloader 237 can be moved independently.

The loader 236 turns at a position "O" to take the work pieces from the turn table 226 and take the resin tablets from the tablet holder 229. The loader 236 is turned to head the molding dies 221a–221d, then the loader 236 is moved to a position "M" or "N", along the guide rail 238, so as to feed the work pieces and the resin tablets to the assigned press unit. On the other hand, the unloader 237 has waited at the position "M" or "N", then the unloader 237 takes out the ejected products from the opened dies 221a–221d of the press units 222a–222d. Further, the unloader 237 is moved to a position "O" along the guide rail 238, then the unloader 237 is turned to head a degating unit 232, if necessary, to transfer the products thereto. After the unloader 237 takes out the products from the opened dies 221a–221d of the press units 222a–222d, the loader 236 enters the opened dies 221a–221d instead of the unloader 237 so as to set next work pieces and next resin tablets in the molding dies 221a–221d. The conventional resin molding unit was disclosed in a Japanese Patent Gazette No. 10-58457.

These days, semiconductor devices are made compact and highly integrated with fine wires. Further, in some semiconductor devices, parts of leads are projected from a package section and connecting portions, which will be connected to terminals, e.g., bumps, solder balls, are exposed. In these cases, parting faces of a molding dies of a press unit is covered with release film, which is supplied and collected by a film unit. A conventional resin molding machine having the film unit will be explained with reference to FIGS. 22 and 23.

As shown in FIG. 22, the conventional resin molding machine includes: a press unit 242 having a molding die 241; a work piece feeding unit 245 feeding work pieces, e.g., lead frames, substrates, accommodated in feeding magazines 243 to a feeding table 244; a storing unit 246 storing the resin tablets; a resin tablet feeding unit 250 having a bowl feeder 247 and a linear feeder 248, which form the resin tablets in line and feed in a prescribed direction, and feeding tablet holders 249, in which the resin tablets are respectively set, to the feeding table 244; a degating unit 251 removing disused resin from molded products, which are taken out from the molding die 241; a product accommodating unit 253 having accommodating magazines 252, in which the molded products, from which the disused resin is removed, are accommodated; and a control unit 254 controlling the whole machine.

When the work pieces and the resin tablets are supplied onto the feeding table 244, they are held by a loader 255 and conveyed to the molding die 241, which has been opened. On the other hand, when the molded products are ejected from the molding die 241, they are held by an unloader 256 and conveyed to the degating unit 251. At that time, the unloader 256 cleans parting faces of the molding die 241. The unloader 266 holds and presses substrates of the molded products, and they are cooled by air so as to prevent deformation of the substrates in the degating unit 251. In the degating unit 251, the substrates are twisted to remove the disused resin, so the unloader 256 leaves the molded products, from which the disused resin is removed, and returns to take out next products. The loader 255 and the uunloader 256 are moved along a common guide rail 257, which is provided above the press unit 242. Namely, the loader 255 is reciprocatively moved between the feeding table 244 and the molding die 241; the unloader 256 is reciprocatively moved between the molding die 241 and the degating unit 251.

In FIG. 23, the release film 259 is supplied from the film unit 258 to cover an upper die 241a of the molding die 241. The film unit 258 is held by a fixed platen 260, to which the upper die 241a is fixed. The film unit 258 includes a film feeding section 261, which is provided on one side of the press unit 242, and a film collecting section 262, which is provided on the other side of the press unit 242 (see FIG. 22). By rotating rollers of the film feeding section 261 and the film collecting section 262, the release film 259 is sent a prescribed length from the one side of the press unit 242 to the other side thereof. The feeding direction of the release film 259 is perpendicular to the moving direction of the loader 255 and the unloader 256.

In the conventional resin molding machines, the work pieces are conveyed from the work piece feeding unit to the press unit by the loader; the molded products are conveyed from the press unit to the product accommodating unit. The work piece feeding unit includes a work piece feeding section, which sends the lead frames, the plastic substrates, etc. from the feeding magazines to the feeding table by a pusher, etc., and a tablet feeding section, which sends the tablet holders, which have holding holes corresponding to hot pitch and in which the resin tablets are set, to the feeding table. The work pieces and the resin tablets on the feeding table are held by the loader, which has waited above the feeding table. The loader conveys the work pieces and the resin tablets to the press unit, whose dies have been opened. The press unit clamps the work pieces and molds the work pieces with the resin (see FIGS. 20 and 22).

For example, a spiral vibrating parts feeder, in which a plurality of the resin tablets are stored in a bowl-shaped container and moved, with the same heading, in a spiral path by vibrating a bottom part of the container, is used as the tablet feeding section. An example of the spiral vibrating parts feeder was disclosed in a Japanese Patent Gazette No. 5-138681, in which the resin tablets are sent in order and the head of the resin tablet line is held by a hand and set in a molding die.

Another type of the tablet feeding section was disclosed in Japanese Patent Gazettes No. 6-166049 and No. 10-15994, in each of which a linear vibrating parts feeder is combined with the spiral vibrating parts feeder.

These days, semiconductor devices are made compact and highly integrated with fine wires. In QFNs (Quad Flat Non-leaded), parts of leads are projected from package sections; in BGAs (Ball Grid Array), connecting portions, which will be connected to terminals, e.g., bumps, solder balls, are exposed. Further, in some cases, a plurality of semiconductor chips are molded in one time. Preferably, in these cases, parting faces of the molding dies of the press unit is covered with release film.

In some products, heat sinks are molded together with the chips due to efficient heat radiation. In cavity down type packages, connecting faces, which will be connected to terminals, are formed, around cavities, on surfaces of substrates, so resin paths cannot be formed on the substrates. In this case, an intermediate die is detachably attached between an upper die and a lower die so as to mold with resin.

However, in the conventional resin molding machine shown in FIG. 20, the press unit 202 having the molding die 201 is enclosed by the loader 215, the unloader 216, the work piece feeding unit 205, the resin tablet feeding section 210, the degating unit 211 and the product accommodating unit 213, and a working space and an extra space are small. Therefore, it is difficult to change the arrangement of the units for wide application. Especially, the common guide rail 217 of the loader 215 and the unloader 216 is located above the molding die 201, so it is difficult to add other functional section without interfering with the guide rail 217.

In the conventional resin molding machine shown in FIG. 21, a plurality of the press units are provided. Especially, the press units 221a and 221b are enclosed by the base unit 223, the guide rail 238 and the press units 221c and 221d, so it is difficult to modify for wide application as well as the machine shown in FIG. 20.

In the conventional resin molding machine shown in FIG. 22, the press unit 242 having the molding die 241 is enclosed by the work piece feeding unit 245, the resin tablet feeding section 250, the degating unit 251, the product accommodating unit 253 and the control unit 254. With this structure, it is difficult to handle the film collecting section 262, which is located on the other side of the press unit. Further, a space for attaching and detaching the roller of the film collecting section 262 and a maintenance space thereof are small. Since the release film 259 is sent in the direction perpendicular to the direction of moving the loader 255 and the unloader 256, height of the machine must be higher, as shown in FIG. 23, so as to avoid the interference and keep a maintenance space.

Even if the loader 255 and the unloader 256 are combined and moved toward the press unit 242 from one side to form a working space around the press unit 242, conveying routes for feeding the work pieces and the resin tablets and conveying the molded products must be complex, so it is difficult to modify the machine for wide application.

To adjust amount of products and produce many kinds of products with small lot number, the press units of the resin molding machine are formed as modules, so that number of the press units can be changed. To increase number of producing the products, the loader must convey the work pieces and the resin tablets to the press unit or units at high speed. Therefore, the work pieces and the resin tablets must be transferred to the loader in a short time.

In the case of feeding the resin tablets by the spiral vibrating parts feeder only, the resin tablets are sent along a long spiral route, so that it is difficult to feed the resin tablets in a short time. Since the resin tablets are stored in the bowl-shaped container, the container needs a broad setting space. Since the resin tablets are vibrated while they are moved in the spiral route, the resin tablets contact an inner face of the container and another resin tablet, so that the resin tablets are broken, yield of the resin tablets are made lower, resin dusts are scattered and badly influences a working environment.

In the case of combining the linear vibrating parts feeder with the spiral vibrating parts feeder, vibrating directions are mutually different, so it is difficult to match feeding speed of the both parts feeders. If the feeding speed of the both parts feeders are not matched, the resin tablets are crowded, so that the resin tablets contact the inner face of the container and another resin tablet, the resin tablets are broken, and the resin dusts are scattered. Further, the two parts feeders occupy a broader space and increase manufacturing cost.

SUMMARY OF THE INVENTION

A first object of the present invention is to provide a resin molding machine capable of solving the problems of the conventional machines, executing many functions and easily expanding and modifying a structure thereof.

A second object is to provide a compact resin molding machine having enough working space and a film unit, which can be detachably attached to a press unit.

A third object is to provide a resin feeding machine capable of feeding resin tablets in a short time, decreasing manufacturing cost and an installing space.

To achieve the first object, a first basic structure of the resin molding machine comprises:

a work piece feeding unit;

a product accommodating unit;

a press unit for molding a work piece;

a loader for conveying the work piece from the work piece feeding unit to the press unit;

an unloader for taking out a molded product from the press unit;

common rail sections, on which the loader and the unloader are moved to convey the work piece and the molded product; and an additional rail unit having a rail section, on which the loader and the unloader can be moved, the additional rail unit being detachably attached between the work piece feeding unit and the product accommodating unit, wherein the common rail sections and the rail section of the additional rail unit are disconnectably connected.

In the resin molding machine, each of the work piece feeding unit and the product accommodating unit may have the common rail section and a base section.

In the resin molding machine, the unloader, the work piece feeding unit and the product accommodating unit may respectively have sucking ducts, and the rail section of the additional rail unit may have a sucking duct, which is capable of connecting to the sucking duct of the unloader and communicating to the sucking ducts of the work piece feeding unit and the product accommodating unit.

In the resin molding machine, the additional rail unit may have a base section, which includes a rail base supporting the rail section and a support base supporting a functional section.

In the resin molding machine, at least one of the work piece feeding unit, the product accommodating unit and the additional rail unit may include the press unit.

In the resin molding machine, at least one of the press unit may have a film unit.

In the resin molding machine, a functional section, in which a function other than a molding function is executed, may be provided at a position of the press unit.

In the resin molding machine, a resin feeding section, which feeds resin for molding to the press unit, may be provided to one of the work piece feeding unit, the product accommodating unit and the additional rail unit.

In the resin molding machine, an intermediate die feeding section, which attaches an intermediate die to and detaches the same from a place between an upper die and a lower die of the press unit, may be provided to one of the work piece feeding unit, the product accommodating unit and the additional rail unit.

In the resin molding machine, a heat sink feeding section, which feeds a heat sink to the press unit, may be provided to one of the work piece feeding unit, the product accommodating unit and the additional rail unit.

To achieve the second object, a second basic structure of the resin molding machine comprises:

a work piece feeding unit;

a product accommodating unit;

a press unit for molding a work piece;

a loader for conveying the work piece and resin for molding from the work piece feeding unit to the press unit;

an unloader for conveying a molded product from the press unit to the product accommodating unit; and a film feeding section for feeding release film onto a parting face of the press unit, the film feeding section being provided on one side of the press unit; and a film collecting section for collecting used release film, the film collecting section being provided on the other side of the press unit, wherein one of the film feeding section and the film collecting section can be moved away from the press unit.

In the resin molding machine, the loader and the unloader may be moved on one of the sides of the press unit, and one of the film feeding section and the film collecting section may be moved away from the press unit and drawn.

In the resin molding machine, one of the film feeding section and the film collecting section may be turned with respect to the press unit.

In the resin molding machine, the film feeding section may include: a film feeding roller, on which the release film is wound; and a tension roller capable of giving tension to the release film drawn from the film feeding roller, and the film collecting section may include: a film collecting roller which winds the release film used; and a tension roller capable of giving tension to the release film collected by the film collecting roller.

In the resin molding machine, the tension rollers of the film feeding section and the film collecting section may respectively have sensors, which respectively detects revolution numbers of the tension rollers, and revolution numbers of driving sources, which respectively rotate the tension rollers, may be controlled on the basis of output signals of the sensors. With this structure, a length of feeding the release film and tension of the release film can be adjusted, so that the release film can be stably fed.

In the resin molding machine, the film feeding section and the film collecting section may respectively have guide rollers for moving the release film away from the parting face of the press unit. With this structure, the release film can be fed smoothly, and the release film is not damaged by the parting face, so that the release film can be reused.

To achieve the third object, a basic structure of the resin tablet feeding machine comprises:

a tablet sending section including a first tablet container, which forms resin tablets in line and guides them in a sending direction, and a first vibrating section, which vibrates the first tablet container so as to send the resin tablets; and a tablet circulating section including a second tablet container, which accommodates the resin tablets which have been missed to send from the first tablet container and collected, and a second vibrating section, which vibrates the second tablet container so as to send the resin tablets to the first tablet container.

In the resin tablet feeding machine, a first conveying face of the first tablet container, on which the resin tablets are sent, and a second conveying face of the second tablet container, on which the resin tablets are circulated, may be crossed.

In the resin tablet feeding machine, the first vibrating section and the second vibrating section may respectively include linear feeders, whose vibrating directions are mutually opposite.

In the resin tablet feeding machine, a space may be formed between the first tablet container and the second tablet container, and a dust collecting section may be provided under the space.

In the resin molding machine having the first basic structure, the additional rail unit is attached between the work piece feeding unit and the product accommodating unit, and the common rail sections and the rail section of the additional rail unit are disconnectably connected. Therefore, design of the machine can be easily expanded and modified to have many functions. If the unloader, the work piece feeding unit and the product accommodating unit respectively have sucking ducts and the rail section of the additional rail unit has the sucking duct, which is capable of connecting to the sucking duct of the unloader, the additional rail unit can be added easily.

If each of the work piece feeding unit and the product accommodating unit has the common rail section and the base section, functional sections can be changed and detached, so that the working space can be formed, many functions can be executed, layout of the machine can be easily designed for a wide use. If the additional rail unit has the base section including the rail base supporting the rail section and the support base supporting the functional section, a size of the base section can be designed on the basis of the functional section and the machine can be applied for a wide use.

In the resin molding machine having the second basic structure, one of the film feeding section and the film collecting section can be moved away from the press unit. With this structure, a space for exchanging a film roller of the film feeding section or the film collecting section can be formed, so that the film roller can be exchanged easily. If the loader and the unloader are moved on one of the sides of the press unit and the film feeding section or the film collecting section can be moved away from the press unit and drawn, the film feeding section or the film collecting section can be drawn, without interfering the rail section, in a space in which the loader and the unloader are moved, and a compact size machine can be realized. If the film feeding section or the film collecting section can be turned with respect to the press unit, a working space can be formed, so that the film roller can be easily exchanged.

If the tension rollers of the film feeding section and the film collecting section have the sensors and the revolution numbers of the driving sources, which respectively rotate the tension rollers, are controlled on the basis of the output signals of the sensors, the length of feeding the release film and the tension of the release film can be adjusted and the release film can be stably fed.

If the film feeding section and the film collecting section respectively have the guide rollers for moving the release film away from the parting face of the press unit, the release film can be fed smoothly and the release film is not damaged by the parting face. Therefore, the release film can be reused.

In the resin feeding machine of the present invention, the resin tablets in the first tablet container are formed in line and guided in the sending direction, and the resin tablets which have been missed to send from the first tablet container are accommodated in the second tablet container and returned to the first tablet container. With this structure, the resin tablets can be formed in line in a short time, speed of sending the resin tablets can be accelerated and forming resin dusts can be prevented.

If the first conveying face of the first tablet container, on which the resin tablets are sent, and the second conveying face of the second tablet container, on which the resin tablets are circulated, are crossed, good resin tablets, which can be used for molding, and bad resin tablets, which cannot be used for molding, can be properly classified.

If the first vibrating section and the second vibrating section respectively include linear feeders, whose vibrating directions are mutually opposite, vibration of the first tablet container and the second tablet container can be easily matched, so that the resin tablets can be rapidly and smoothly circulated. Further, an installing space and manufacturing cost can be reduces.

If the space is formed between the first tablet container and the second tablet container and the dust collecting section is provided under the space, the resin dusts formed by the vibration can be efficiently collected.

BRIEF DESCRIPTION OF THE DRAWINGS

Embodiments of the present invention will now be described by way of examples and with reference to the accompanying drawings, in which:

FIG. 1A is a plan view of the resin molding machine of a first embodiment of the present invention;

FIG. 1B is a plan view of an additional rail unit of the first embodiment;

FIG. 2A is a right side view of the resin molding machine shown in FIG. 1A;

FIG. 2B is an explanation view of a rail section;

FIG. 2C is an explanation view of the rail section;

FIG. 6 is a plan view of the resin molding machine of a fifth embodiment, in which film units are provided to press units;

FIG. 7A is a plan view of the film unit;

FIG. 7B is a front view of the film unit;

FIG. 8 is an enlarged view of a film feeding section;

FIG. 10 is an enlarged front view of the film feeding section;

FIG. 14 is a plan view of a tablet sending section of the resin molding machine of a sixth embodiment;

FIG. 15 is a side view of the tablet sending section seen from a direction of an arrow S shown in FIG. 14;

DETAILED DESCRIPTION OF THE PREFERRED EMBODIMENTS

Figure 3:
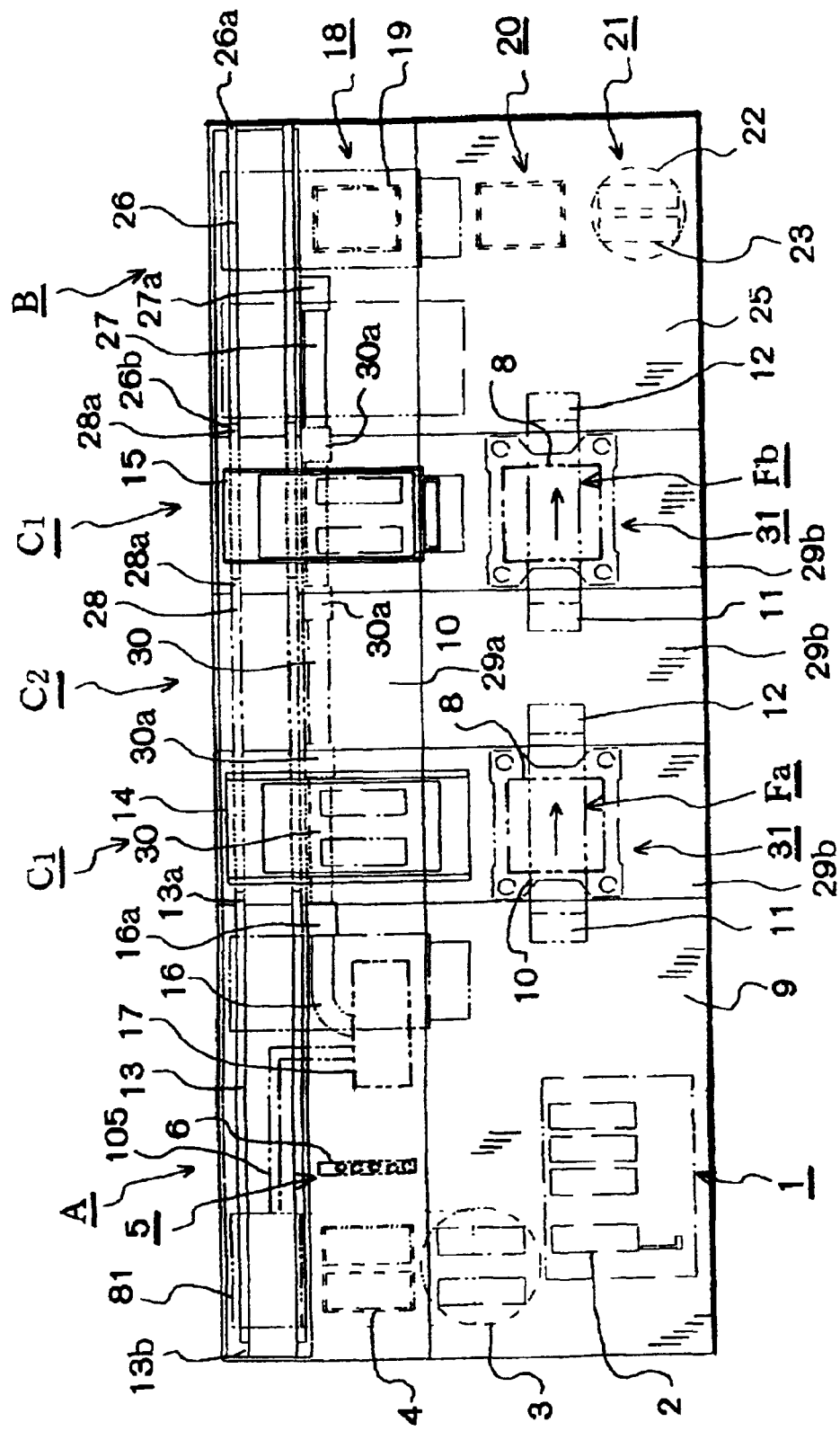
FIG. 3 is a plan view of the resin molding machine of a second embodiment.

Preferred embodiments of the present invention will now be described in detail with reference to the accompanying drawings. In the present invention, a loader, which conveys work pieces to a press unit or units, and an unloader, which conveys molded products from the press unit or units to a product accommodating unit, are moved on common rail sections.

First Embodiment

In the present embodiment, additional rail units are added.

Firstly, an outline of the resin molding machine of the first embodiment will be explained with reference to FIG. 1A. The additional rail units C are provided between a work piece feeding unit A and a product accommodating unit B. The additional rail units C can be disconnected from the units A and B. The work piece feeding unit A, the product accommodating unit B and the additional rail units C respectively have base sections and rail sections. Many kinds of functional sections, e.g., a feeding section, a transferring section, a pick-up section, a degating section, an accommodating section, a press section, a film unit, can be provided on the base sections.

Next, the work piece feeding unit A will be explained. In FIG. 1A, the work piece feeding unit A arranges and feeds work pieces, e.g., lead frames accommodated in feeding magazines 2, plastic substrates, which are located at a work piece feeding section 1, to a turn table 3. The work pieces are further conveyed to a transferring section 4 by a proper conveying mechanism (not shown). A heater for heating the substrates may be provided to the transferring section 4.

A resin feeding section 5 sets resin tablets, which are sent by a linear feeder (not shown), in tablet holders 6 and conveys the tablet holders 6 to the transferring section.

A press unit 7 comprises a molding die 8, a clamping mechanism for opening and closing the molding die 8, a transfer mechanism for sending molten resin to a cavity of the molding die with pressure, etc. The press unit 7 is provided on the base section 9. A film unit F, which is capable of feeding release film 10, is attached to the molding die 8. Note that, press units may be provided to the product accommodating unit B and the additional rail units C, and the film units F may be attached to the additional press units.

The film unit F comprises a film feeding section 11, which is provided on one side of the press unit 7, and a film collecting section 12, which is provided on the other side of the press unit 7. The release film 10 is fed or extended, from the film feeding section 11 to the film collecting section 12, in the direction perpendicular to the rail sections 13, 26 and 28. The release film 10 is used so as to mold, for example, QFNs in which parts of leads are projected from package sections, and BGAs, in which connecting portions, which will be connected to terminals, e.g., bumps, solder balls, are exposed. The release film 10 is capable of resisting heat of the molding die 8, easily peeling off from the molding die 8 and having enough softness and extensivity. The release film 10 is made from, e.g., PTFE, ETFE, PET, FEP, glass cloth including fluorine, polypropylene, polyvinylidene chloride. The release film 10 is fixed on a parting face of the molding die 8 by sucking air through sucking holes bored in the parting face. Note that, other functional sections may be provided on the base section 9 instead of the press unit 7. The base section of the work piece feeding unit A may be narrow and the press unit 7 may be omitted. In the case of feeding the work pieces from outside, the feeding section and the arranging section of the work piece feeding unit A may be omitted.

The rail section 13 is the common rail section. A loader 14, which takes the resin tablets from the tablet holders 6, and an unloader 15, which takes out the products from the press unit 7, are moved on the common rail section 13. The loader 14 and the unloader 15 are moved on the common rail section 13 and capable of moving into and away from the press unit 7, etc. To connect another rail section, extended parts 13a are formed at one end (the right end in FIG. 1A) of the common rail section 13; cut parts 13b are formed at the other end (the left end in FIG. 1A) of the common rail section 13.

A sucking duct 16 is provided to the common rail section 13 and capable of connecting to a sucking duct of the unloader 15. One end of the duct 16 is connected to a vacuum unit 17; a connector 16a is provided to the other end of the duct 16. A sucking duct 30 of the additional rail unit C can be connected to the connector 16a. When the unloader 15 takes out the products from the press unit 7, the duct of the unloader 15 is connected to a connecting hole (not shown) of the connector 16a of the duct 16. While the unloader 15 moves into and away from the molding die 8, which are opened, the unloader 15 cleans the parting faces of the molding die, and resin dusts are sucked and collected by the vacuum unit 17. Note that, cleaners 15e, which are close to the release film 10, can be moved so as not to interfere with the release film 10.

The product accommodating unit B will be explained. In FIG. 1A, a symbol 18 stands for a product take-out section. AT the product take-out section 18, the molded products, which are taken out from one of the press units, are transferred to a moving table 19, which is located under the product take-out section 18. Upon transferring the molded products to the moving table 19, the unloader 15 moves to take out next products. The moving table 19 holds and conveys the products to a degating section 20. The degating section 20 presses and cools the products, which have been conveyed by the moving table 19, and removes disused resin by twisting the products. The disused resin, which have been removed from the products, are accommodated in a scrap box (not shown). The moving table 19 further conveys the products, from which the disused resin is removed, to an accommodating section 21. At the accommodating section 21, the products on the moving table 19 are once picked up by a pick-up 22. Then, the moving table 19 returns to the product take-out section 18. The pick-up 22 arranges and accommodates the products into accommodating magazines 23. The unloader 15 has no gate-breaking mechanism and no cooling mechanism, so the unloader 15 can move to take out the next products soon after transferring the products at the product take-out section 18. Therefore, the products can be taken out and transferred in a short time.

A press unit 24 is provided on a base section 25. The press unit 7 comprises a molding die 8, a clamping mechanism for opening and closing the molding die 8, a transfer mechanism for sending molten resin to a cavity of the molding die with pressure, etc. The film unit F can be attached to the press unit 24. Note that, other functional sections may be provided on the base section 25 instead of the press unit 24. The base section of the product accommodating unit B may be narrow and the press unit 24 may be omitted. In the case of conveying the work pieces outside, the degating section and the accommodating section of the product accommodating unit B may be omitted.

The rail section 26 is the common rail section. The loader 14, which takes the work pieces and the resin tablets to the press unit 24, and the unloader 15, which takes out the products from the press unit 24, are moved on the common rail section 26. To connect another rail section, extended parts 26a are formed at one end (the right end in FIG. 1A) of the common rail section 26; cut parts 26b are formed at the other end (the left end in FIG. 1A) of the common rail section 26.

A sucking duct 27 is provided to the common rail section 26. One end of the duct 27 is connected to a connector 30a of a duct 30 of the additional rail unit C; the other end of the duct 27 has a connector 27a. When the unloader 15 takes out the products from the press unit 24, the duct of the unloader 15 is connected to a connecting hole (not shown) of the connector 27a of the duct 27. While the unloader 15 moves into and away from the molding die 8, which are opened, the unloader 15 cleans the parting faces of the molding die, and resin dusts are sucked and collected by the vacuum unit 17, which is provided to the work piece feeding unit A.

Next, the additional rail units C will be explained. The additional rail units C are detachably attached between the work piece feeding unit A and the product accommodating unit B. Rail sections 28 are respectively provided to the additional rail units C. The rail sections 28 are connected to the rail sections 13 and 26. The loader 14 and the unloader 15 can move on the rail sections 13 and 26, too. Namely, the loader 14 and the unloader 15 can continuously move on the rail sections 13, 26 and 28 (see FIG. 1B). Extended parts 28a are formed at one end (the right end in FIG. 1B) of each rail section 28, and cut parts 26b are formed at the other end (the left end in FIG. 1A) of each rail section 28 as well as the common rail sections 13 and 26.

Each of base sections 29 supports the rail section 28 and many kinds of the functional sections, e.g., the press unit 31, the film unit F. The additional rail units C are provided between the work piece feeding unit A and the product accommodating unit B, and the rail sections 13, 26 and 28 are connected. The base sections 9 and 29, the base sections 29 and 29 and the base sections 29 and 25 are mutually connected by bolts. Note that, the additional rail units C can be exchanged to other additional rail units, but the functional sections of the additional rail units C may be exchanged to other functional sections.

Each of the additional rail units C has a duct 30, whose one end has a connector 30a capable of connecting to the duct of the unloader 15. When the additional rail units C are attached between the work piece feeding unit A and the product accommodating unit B, the ducts 30 are connected to the ducts 16 and 27, which are respectively provided to the rail sections 13 and 26, by the connectors 16a and 30a, so that the ducts 30 are connected to the vacuum unit 17 (see FIG. 1A).

In the present embodiment, as shown in FIG. 1A, two additional rail units C are added between the work piece feeding unit A and the product accommodating unit B. The extended parts 13a and the cut parts 28b are fitted, so that the rail sections 13 and 28 are connected. And, the connector 16a of the duct 16 is connected to one end of the duct 30, so that the work piece feeding unit A and the additional rail unit C are connected. The extended parts 28a and the cut parts 26b are fitted, so that the rail sections 26 and 28 are connected. And, the connector 30a of the duct 30 is connected to one end of the duct 27, so that the additional rail unit C and the product accommodating unit B are connected. The extended parts 28a of one of the rail section 28 (the left rail section 28 in FIG. 1A) and the cut parts 28b of the other rail section 28 are fitted, so that the rail sections 28 are connected. And, the connector 30a of one of the ducts 30 is connected to one end of the other duct 30, so that the additional rail units C are mutually connected.

The additional rail unit C, on which a press unit 31 is mounted, will be explained with reference to FIGS. 2A–2C.

The base section 29 includes a rail base 29a and a support base 29b. The press unit 31 is mounted on the support base 29b. The rail base 29a and the support base 29b may be integrated or separable. In the case of the separable structure, a length L of the support base 29b can be changed on the basis of size of the functional section. Note that, in the present embodiment, the length L is defined by the size of the film unit F.

The rail section 28 is mounted on the rail base 29a. The rail section 28 includes a rail supporting member 32 and a rail block 33 fixed on the supporting member 32. L-shaped portions 33a are formed along both side edges of the rail block 33, and the rails 13, 26, 28 are respectively fixed in the L-shaped portions 33a (see FIG. 2C). The supporting member 32 has a duct supporting portion 32a, which supports the duct 30 along the rails 13, 26, 28. Height H of the rails 13, 26, 28 are defined on the basis of moving areas of the mechanisms 14a and 15a, which move to and away from the molding die 8, of the loader 14 (see FIG. 2B) and the unloader (see FIG. 2A). Height of the rail supporting member 32 can be adjusted by providing a spacer or spacer on the rail base 29a. A control unit 35 of the functional sections, e.g., the press unit 31 and the film unit F on the support base 29b, is provided to the rail base 29a. Note that, the work piece feeding unit A and the product accommodating unit B may have the integrated or separable rail bases and support bases.

Two Shafts 39 and two shafts 40 are provided to the rail supporting member 32 of the work piece feeding unit A, the product accommodating unit B or the additional rail unit C. A driving pulley and a driven pulley are respectively provided to the shafts 39; another driving pulley and another driven pulley are respectively provided to the shafts 40. A timing belt is engaged with the pulleys of the shafts 39; another timing belt is engaged with the pulleys of the shafts 40. The loader 14 is fixed to the timing belt by a connecting member 14c; the unloader 15 is fixed to the other timing belt by a connecting member 15c. The loader 14 is moved by rotating the shaft 39 of the driving pulley; The unloader 15 is moved by rotating the shaft 40 of the driving pulley. The loader 14 and the unloader 15 are moved, on the rails 13, 26, 28, between the units. The mechanisms 14a and 15a of the loader 14 and the unloader 15 respectively have guide rollers 14b and 15b. A guide 41 is fixed to press posts of the press unit 31. The guide rollers 14b and 15b are rotatably provided in a groove of the guide 41, so that the mechanisms 14a and 15a are capable of moving to and away from the molding die 8. The guide 41 and the guide rollers 14b and 15b are capable of vertically moving with respect to the press unit 31 (see FIG. 2A).

The press unit 31 is mounted on the support base 29b. The press unit 31 comprises the molding die 8, a clamping mechanism for opening and closing the die 8, and a transfer mechanism for sending molten resin to a cavity with pressure.

Note that, in FIG. 2A, the film unit F of the press unit 7 of the work piece feeding unit A is shown by two-dot chain lines. The film feeding section 11 is provided on the rail section 28 side of an upper die 8c of the molding die 8; the film collecting section 12 is provided on the other side thereof. In the film feeding section 11, a film cover 11a is rotated about a shaft 52; in the film collecting section 12, a film cover 12a is rotated about a shaft 12b. Film rolls are detachably attached.

The film unit F may be provided to a lower die of the molding die 8, too. In this case, a space for exchanging the film roll is very narrow, so the film feeding section 11 is capable of moving in the vertical direction while the molding die 8 is opened. With this structure, the film roll can be attached and detached, in a space formed on the rail section 28 side, by turning the film cover 11a.

The additional rail units C are detachably attached between the work piece feeding unit A and the product accommodating unit B, and the rail sections 13, 26 and 28 are continuously connected. Sized of the base sections of the units A, B and C are designed on the basis of the functional sections to be mounted. With this structure, the resin molding machine and functions of the machine can be expanded and modified. The design of the resin molding machine can be optionally designed. The ducts 30, which can be connected to the duct of the unloader 15, are provided to the rail sections 28, on which the loader 14 and the unloader 15 move, so the additional rail units C can be easily attached and detached.

In the case of providing the press units 7 and 24 to the work piece feeding unit A and the product accommodating unit B, number of the units can be reduced. Namely, the resin molding machine can be constituted by connecting the work piece feeding unit A to the product accommodating unit B. Since the press units 7 and 24 of the work piece feeding unit A and the product accommodating unit B can be detached and exchanged, functions of the resin molding machine can be expanded and a working space can be formed. If the support base 29b, on which the functional section is mounted, can be separated from the rail base 29a, the size of the base section 29 can be optionally designed on the basis of the functional section to be mounted and the functions of the resin molding machine can be further expanded.

If the press unit 31 is mounted on the support base 29b of the additional rail unit C, productivity can be increased and the machine can be modified to produce many kinds of products.

In the case of providing a plurality of press units in the resin molding machine, one of the press unit may be used as a unit for gradually cooling the products. These days, one face of a substrate is molded to simultaneously mold a plurality of chips, then the molded substrate is divided into a plurality of semiconductor devices. In this case, molded area is broad, so the molded section is shrieked and apt to be curved. If the molded section is curved, it is difficult to properly divide by a cutter. Therefore, the products are gradually cooled so as not to curve or deform the products. An exclusive cooling section for gradually cooling the products may be provided instead of the press unit for cooling the products.

Second Embodiment

A second embodiment will be explained with reference to FIG. 3. Note that, elements explained in the first embodiment are assigned the same symbols and explanation will be omitted.

In the present embodiment, two additional rail units C1, each of which has the press unit 31, are provided between the work piece feeding unit A and the product accommodating unit B. Further, an additional rail unit C2, which has no functional section or unit, is provided between the additional rail units C1 so as to form a space. No press units are provided to the work piece feeding unit A and the product accommodating unit B so as to form spaces. The work piece feeding unit A and the additional rail unit C1, the product accommodating unit B and the additional rail unit C1, and the additional rail units C1 and C2 are mutually connected. The rail sections and the ducts are also mutually connected as well as the first embodiment.

Spaces are formed on the base section 9 of the work piece feeding unit A, the base section 25 of the product accommodating unit B and a base section 29b of the additional rail unit C2, so film units Fa and Fb are respectively provided to the press units 31 and the release films are fed in the direction parallel to the rail sections. Namely, the film feeding section 11 is provided to the base section 9; the film collecting section 12 and another film feeding section 11 are provided to the base section 29b of the additional rail unit C2; and another film collecting section 12 is provided to the base section 25. Thickness of the release films 10, which are respective fed by the film units Fa and Fb, may be same. The thickness of the release films 10 are defined on the basis of products.

Unlike the case of feeding the release film in the direction perpendicular to the rail sections, spaces for attaching and detaching the feeding film rolls and the collected film rolls can be formed in the second embodiment. Therefore, the films can be easily and efficiently exchanged.

Third Embodiment

Figure 4:
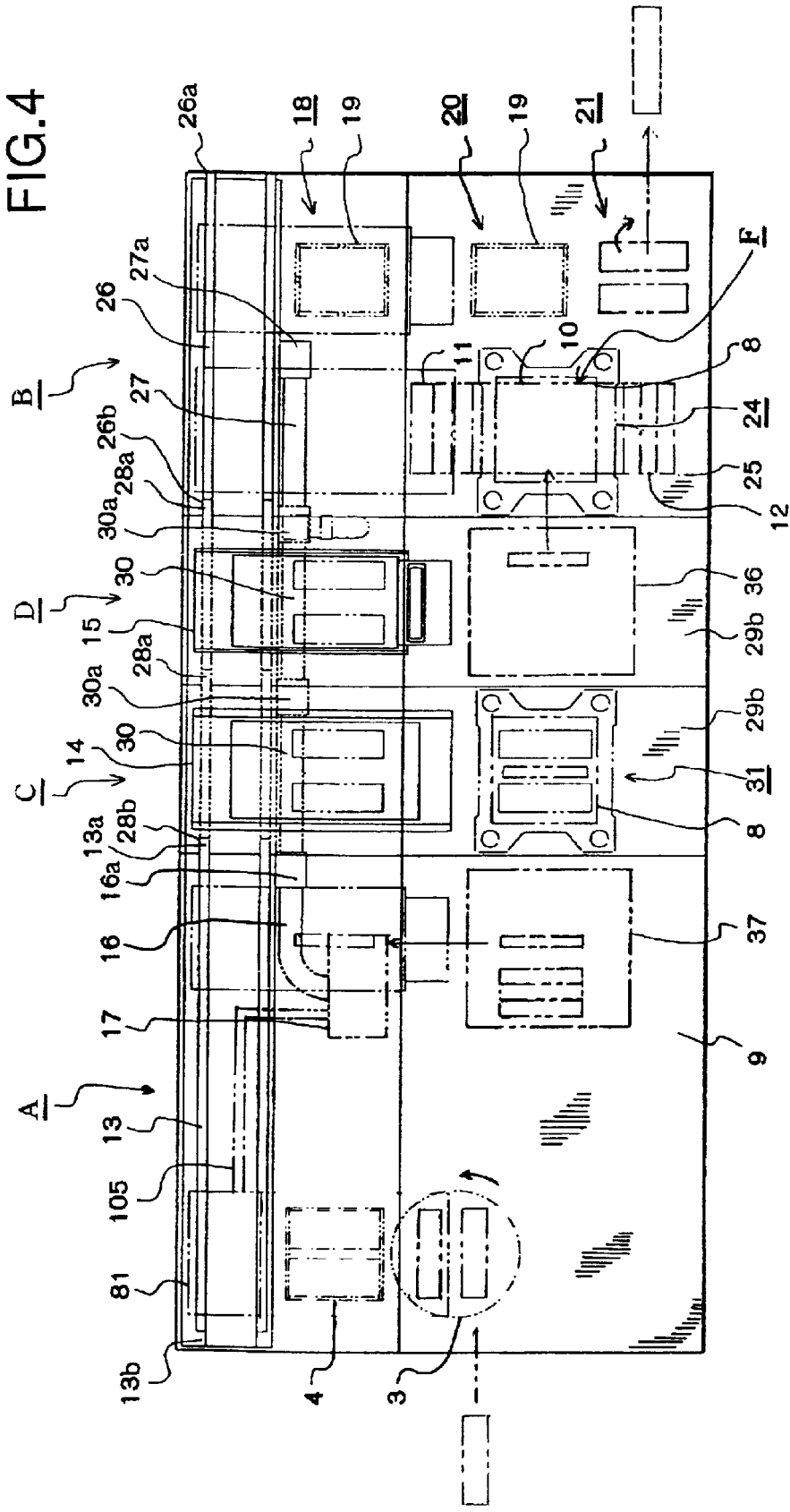
FIG. 4 is a plan view of the resin molding machine of a third embodiment.

A third embodiment will be explained with reference to FIG. 4. Note that, elements explained in the first embodiment are assigned the same symbols and explanation will be omitted.

In the present embodiment, the additional rail unit C, which has the press unit 31, and an additional rail unit D, which has a resin feeding section 36 capable of feeding wrapped resin tablets, liquid resin, etc., are provided between the work piece feeding unit A and the product accommodating unit B. A resin feeding section 37 is provided to the base section 9. The press unit 24 is provided to the base section 25 of the product accommodating unit B. Positions of the resin feeding sections 36 and 37 respectively correspond to the positions of the press unit of the first embodiment.

The work piece feeding section 1, in which the feeding magazines 2 are accommodated, may be provided to the work piece feeding unit A, but the work pieces may be directly fed to the turn table 3 from a work piece manufacturing machine. The pick-up 22 and the accommodating magazines 23 may be provided to the product accommodating section 21 of the product accommodating unit B, but the products may be directly sent to a machine for following steps, e.g., cutting, bending. In this case, an inline-type system including the resin molding machine can be realized.

The work piece feeding unit A and the additional rail unit C, the product accommodating unit B and the additional rail unit D, and the additional rail units C and D are mutually connected. The rail sections and the ducts are also mutually connected as well as the first embodiment.

In the present embodiment, the wrapped resin tablets, the liquid resin, etc. may be supplied from the resin feeding sections 36 or 37 to the press units 24 and 31 by the loader 14. The resin may be supplied from the resin feeding section 37 to the press unit 31, and the resin may be supplied from the resin feeding section 36 to the press unit 24.

In the case of molding the cavity down type packages in which connecting faces are formed, around cavities, on surfaces of substrates, resin paths cannot be formed on the substrates, so an intermediate plate die is provided between an upper die and a lower die. Thus, an intermediate die feeding section, which attaches the intermediate die to and detaches the intermediate die from a place between the upper die and the lower die of the press unit 31, and another intermediate die feeding section, which attaches the intermediate die to and detaches the intermediate die from a place between the upper die and the lower die of the press unit 24, may be provided to the units.

In the resin molding machine of the third embodiment, the wrapped resin tablets, the liquid resin, etc. can be use on the basis of products. Further, the intermediate dies can be used, so that the resin molding machine having many functions can be easily realized.

Fourth Embodiment

Figure 5:
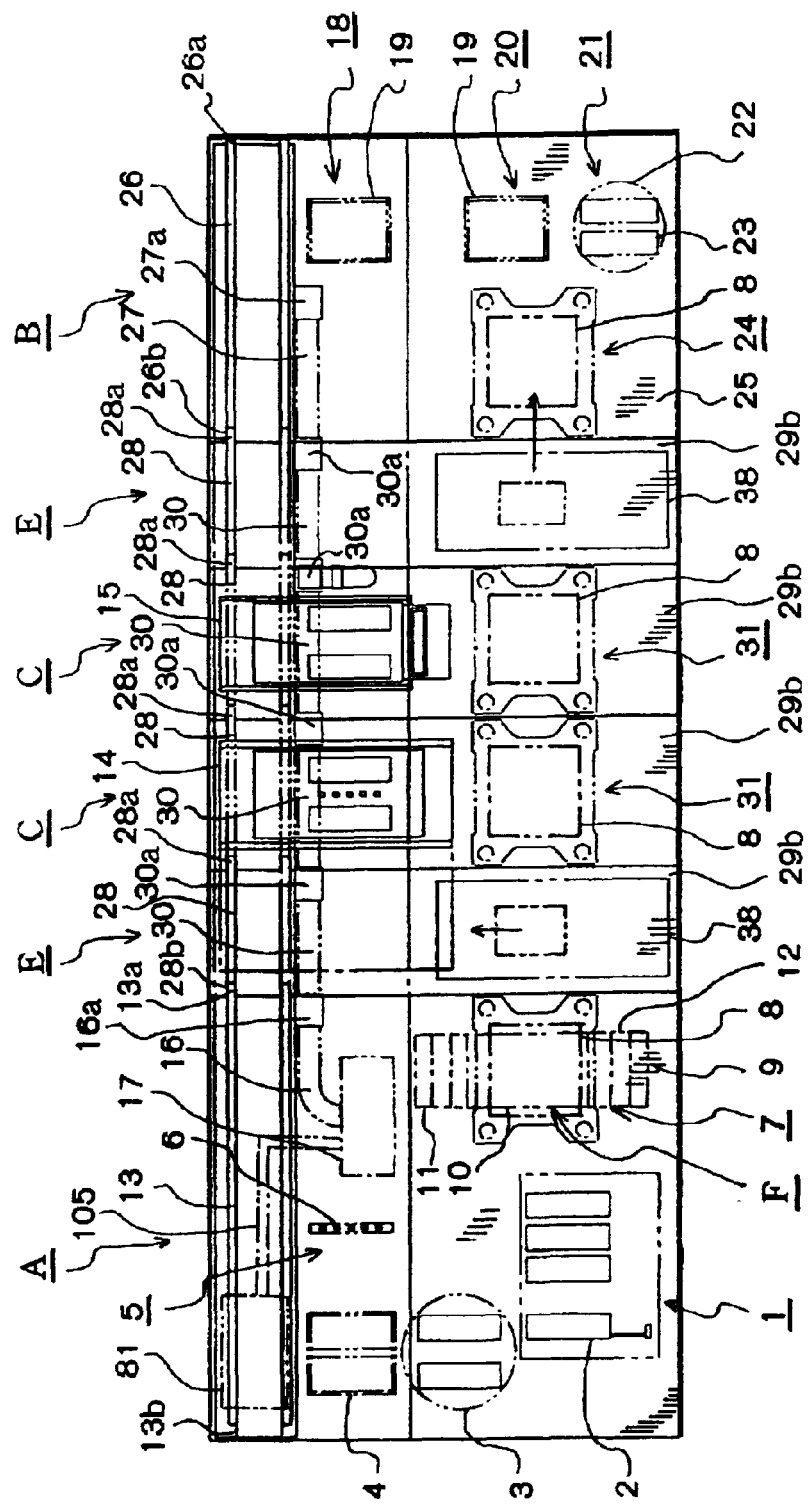
FIG. 5 is a plan view of the resin molding machine of a fourth embodiment.

A Fourth embodiment will be explained with reference to FIG. 5. Note that, elements explained in the first embodiment are assigned the same symbols and explanation will be omitted.

In the present embodiment, two additional rail units C, each of which has the press unit 31, and two additional rail units E, each of which has a heat sink feeding section 38 capable of feeding heat sinks to the press units, are provided between the work piece feeding unit A and the product accommodating unit B. The additional rail units E are respectively provided on both sides of the additional rail units C. The press unit 7 is provided to the base section 9 of the work piece feeding unit A. The press unit 24 is provided to the base section 25 of the product accommodating unit B.

The additional rail units C, the additional rail unit C and E, the work piece feeding unit A and the additional rail unit E, and the product accommodating unit B and the additional rail unit E are mutually connected. The rail sections and the ducts are also mutually connected as well as the first embodiment.

To effectively radiate heat from semiconductor packages, heat sinks are, for example, are mounted on semiconductor chips and molded. In this case, the heat sinks may be supplied to the press units 7, 24 and 31, by the loader 14, from one heat sink feeding section 38. And, the heat sinks may be supplied to the press units 7 and 31 from one heat sink feeding section 38; the heat sinks may be supplied to the press units 24 and 31 from the other heat sink feeding section 38.

In the present embodiment, the resin molding machine can have the function of molding the heat sinks with the semiconductor packages. The functions of the machine can be easily expanded.

To expand functions of the resin molding machine of the first to the fourth embodiments, other kinds of the functional sections or units, e.g., a die cleaning unit, a jig collecting section, may be provided to the work piece feeding unit, the product accommodating unit and the additional rail units.

Fifth Embodiment

A fifth embodiment of the resin molding machine will be explained with reference to FIGS. 6–13B. The resin molding machine has the film units F. The structure of the resin molding machine other than the film units F is similar to that of the foregoing embodiments, so elements explained in the foregoing embodiments are assigned the same symbols and explanation will be omitted.

FIG. 6 shows arrangement of the film units F. Three press units 7, 24 and 31 are arranged side by side. The press units F are respectively detachably attached to the press units 7, 24 and 31. In some cases, the film unit is attached to at least one of the press units. Each film unit F has the film feeding section 11, which is located on one side of the press unit, and the film collecting section 12, which is located on the other side of the press unit. As shown by two-dot chain lines in FIG. 7B, the film feeding section 11 of each film unit F is capable of moving, on the rail sections 13, 28 and 26, away from an upper fixed platen 8a. Therefore, the film feeding section 11 can be drawn outward. The film collecting section 12 of each film unit F is capable of turning, with respect to the upper fixed platen 8a, about a shaft 12c.

Details of the film unit F will be explained with reference to FIGS. 7A and 7B.

The film feeding section 11 includes: a film feeding roller 11c, on which the release film 10 is wound; and a tension roller 11d capable of giving fixed tension to the release film 10 drawn from the film feeding roller 11c. On the other hand, the film collecting section 12 includes: a film collecting roller 12c which winds the release film 10 used; and a tension roller 12d capable of giving fixed tension to the release film 10 collected by the film collecting roller 12c.

The tension rollers 11d and 12d have sensors 11e and 12e, which respectively detect revolution numbers (rotational speed) of the tension rollers 11d and 12d. The revolution numbers of motors 42 and 43, which respectively rotate the tension rollers 11d and 12d, are controlled on the basis of output signals of the sensors 11e and 12e. Note that, one of the sensors 11e and 12e may be omitted. In the present embodiment, even if diameters of the film rolls are changed, the release film 10 can be stably supplied with fixed feeding length and fixed tension.

The film feeding section 11 has two guide rollers 44; the film collecting section 12 has two guide rollers 45. The guide rollers 44 and 45 move the release film 10 away from the parting face of the molding die 8. The guide rollers 44 and 45 can be moved, by cylinder units 46 and 47, in the vertical direction, so that the release film 10 can be moved to and away from the parting face. When the release film 10 is fed a prescribed length, the release film 10 is moved away from the parting face by the cylinder units 46 and 47, so that the release film 10 can be smoothly fed without damaging the release film 10. Therefore, the used release film 10 can be reused.

If the film feeding section 11 is located on inner side, a working space for exchanging the film roll is narrow. To solve the problem, the film feeding section 11 can be drawn outward via a vacant space above the rail sections 13, 26 and 28. This structure will be explained with reference to FIGS. 8–11.

In FIG. 8, the film feeding section 11 is detachably attached to the upper fixed platen 8a with an attaching plate 48. One ends of rail rods 49 are respectively fixed to ends of the attaching plate 48; the other ends of the rail rods 49 are fixed to a rod plate 50. Holder plates 51 are slidably connected to the rail rods 49, and a connecting shaft 52 is spanned between the holder plates 51. As shown in FIG. 10, a film holding plate 53 is connected to the connecting shaft 52. The film feeding roller 11c and the motor 42 are attached to the film holding plate 53 (see FIG. 7A).

Figure 9:
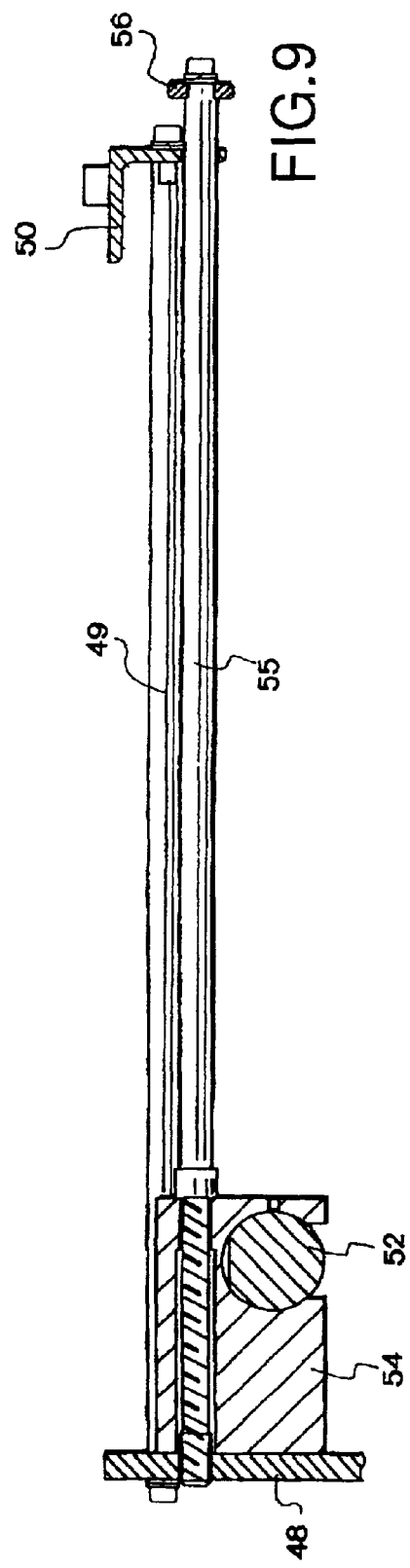
FIG. 9 is a sectional view taken along a line P—P shown in FIG. 8.
Figure 12:
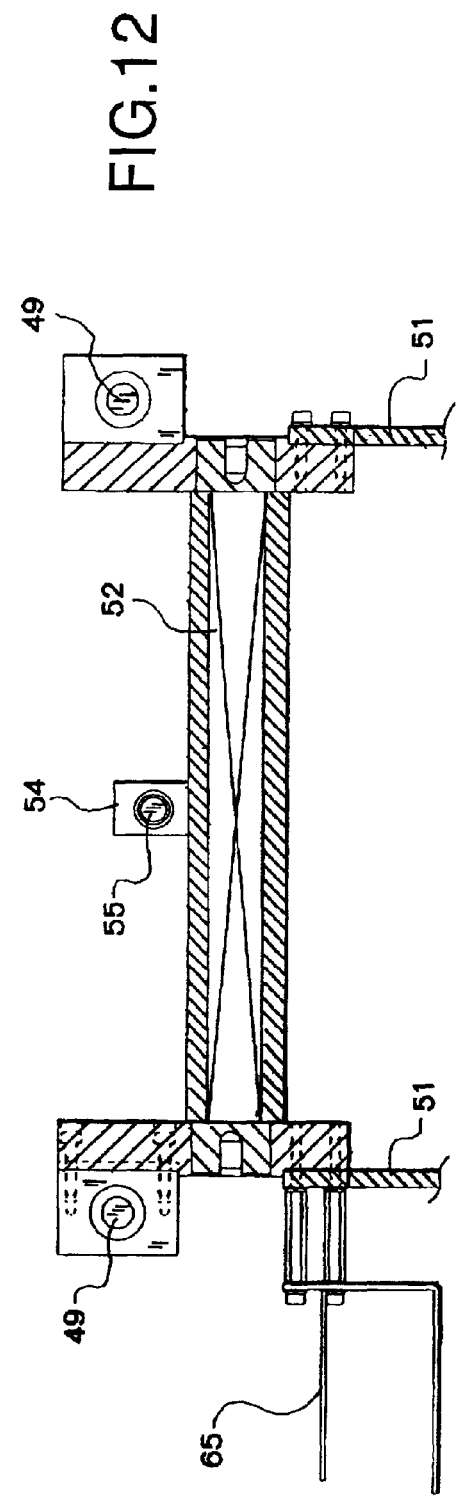
FIG. 12 is a sectional view taken along a line R—R shown in FIG. 10.

In FIG. 9, a rod plate 54 is connected to the connecting shaft 52. A rod 55 is pierced through the rod plate 54, and a screw section of the rod 55 is screwed with the rod plate 54. The end of the screw section of the rod 55 is also screwed with the attaching plate 48. The other end of the rod 55 is pierced through a plate 50, and a handle 56 is attached to the other end of the rod 55. By rotating the handle 56, the one end of the rod 55 can be connected to and disconnected from the attaching plate 48. By drawing the rod 55 rightward in FIG. 9, the plates 51 and 53, which are connected by the plate 54 and the shaft 52, are slid on the rail rods 49, so that the film feeding section 11 can be drawn beyond the rail section. A moving range of the plate 51 is limited when a part of the plate 53 contacts the plate 50.

Figure 11:
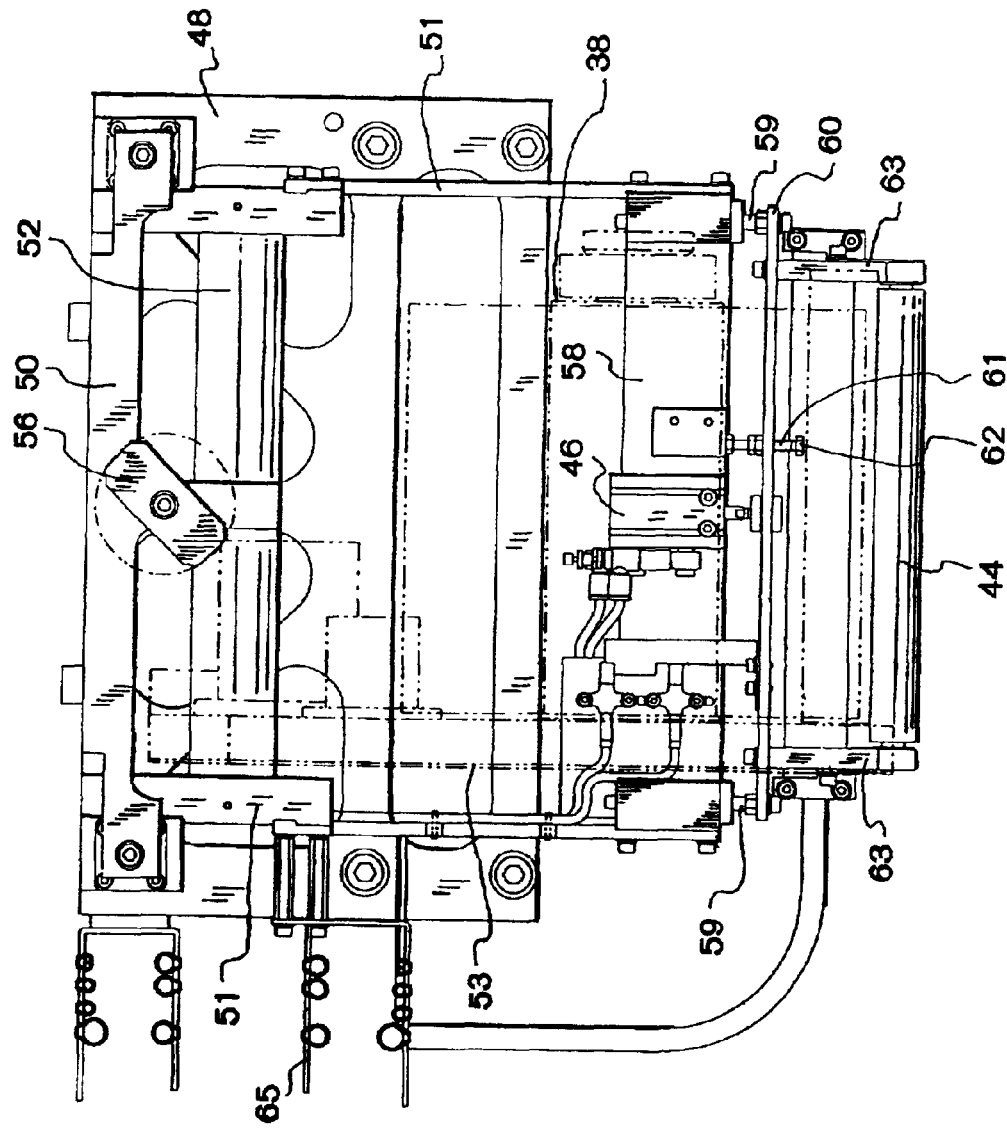
FIG. 11 is a side view of the film feeding section seen from a direction of an arrow Q shown in FIG. 10.

In FIGS. 10 and 11, the plates 51 are fixed to the shaft 52 by keys 57 so as not to rotate. A movable plate 58 is spanned between lower ends of the plates 51. The cylinder unit 46 is fixed to a center part of the movable plate 58; guide rods 59 are respectively fixed to both ends of the movable plate 58.

A front end of a cylinder rod of the cylinder unit 46 is connected to a horizontal plate 60. By actuating the cylinder unit 46, the horizontal plate 60 is moved in the vertical direction. One end of a bolt 61 is fixed to the movable plate 58; the other end of the bolt 61 is pierced through the horizontal plate 60. A moving range of the horizontal plate 60 can be changed by changing a distance between stopper nuts 62, which are screwed with the bolt 61. Roller plates 63, which are extended in the vertical direction, are respectively provided to both ends of the horizontal plate 60. The guide roller 44 is rotatably spanned between the roller plate 63. An ion blower 64, which blows ion to remove static electricity from the release film 10, is provided to the roller plates 63. Therefore, problems caused by the static electricity in the release film 10 can be prevented. In FIG. 11, wire guides 65, which guide wires and tubes without twisting each other, are provided to the movable plate 51.

Figure 13A:
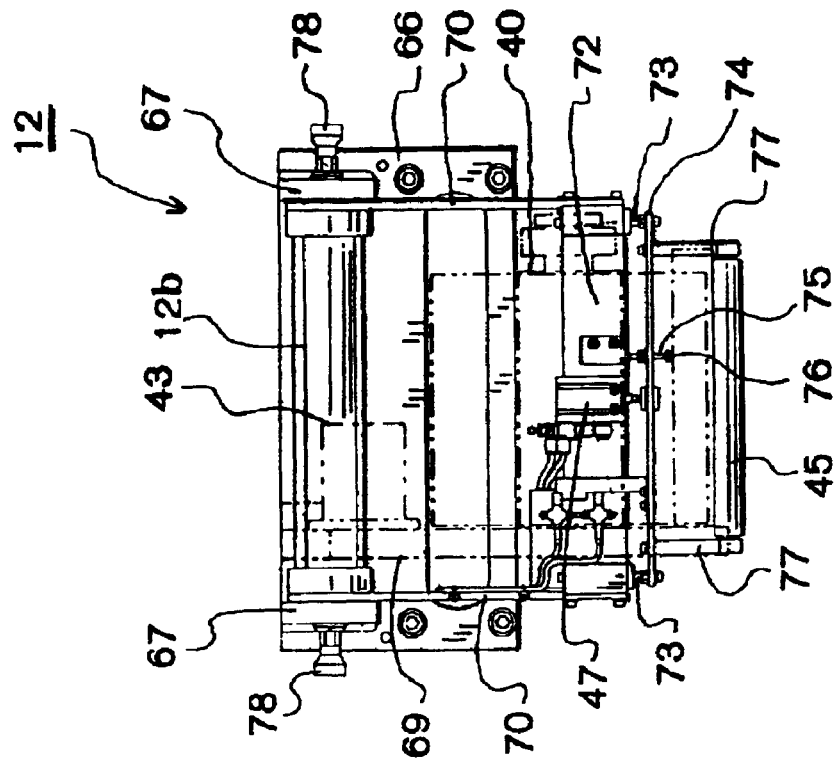
FIG. 13A is a front view of a film collecting section.
Figure 13B:
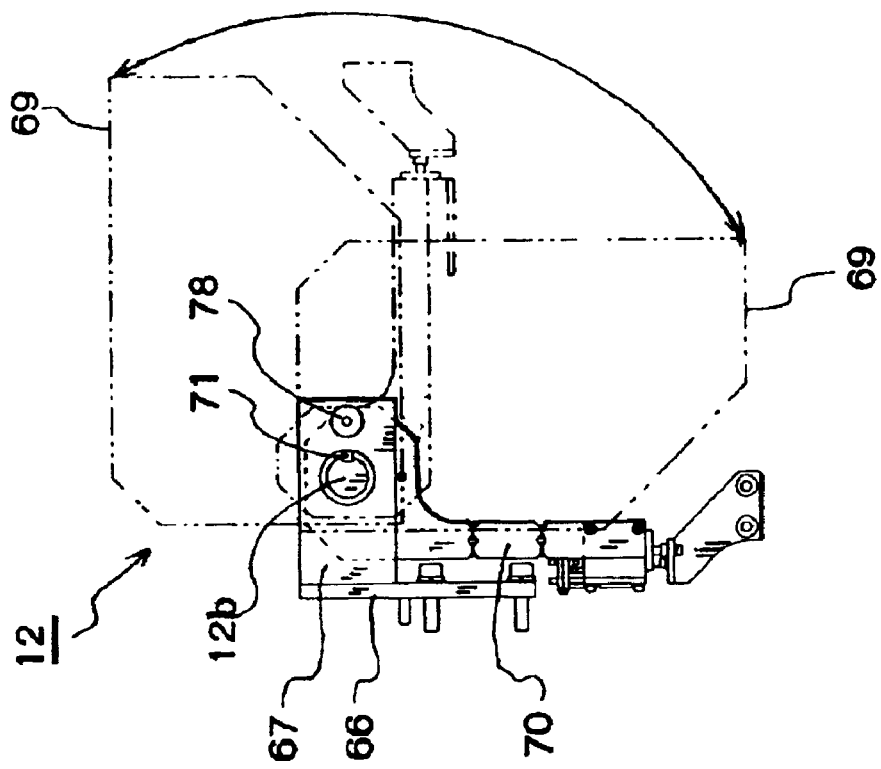
FIG. 13B is a right side view of the film collecting section.

Successively, the film collecting section 12 will be explained with reference to FIGS. 13A and 13B. In FIG. 13A, the film collecting section 12 is detachably attached to the upper fixed platen 8a with an attaching plate 66. Plates 67 are respectively extended from both sides of the attaching plate 66. A shaft 12b is spanned between the plates 67. As shown in FIG. 13B, a film plate 69 is connected to the shaft 12b. The film collecting roller 12c and the motor 43 are attached to the film plate 69.

In FIG. 13B, fixed plates 70 are respectively connected to both ends of the shaft 12b and located close to the plates 67. The fixed plates 70 are fixed to the shaft 12b by keys 71 so as not to rotate. A plate 72 is spanned between lower ends of the fixed plates 70. The cylinder unit 47 is fixed to a center part of the plate 72; guide rods 73 are respectively fixed to both ends of the plate 72.

A front end of a cylinder rod of the cylinder unit 47 is connected to a horizontal plate 74. By actuating the cylinder unit 47, the horizontal plate 74 is moved in the vertical direction. One end of a bolt 75 is fixed to the plate 72; the other end of the bolt 75 is pierced through the horizontal plate 74. A moving range of the horizontal plate 74 can be changed by changing a distance between stopper nuts 76, which are screwed with the bolt 75. Roller plates 77, which are extended in the vertical direction, are respectively provided to both ends of the horizontal plate 74. The guide roller 45 is rotatably spanned between the roller plate 77.

Screws 78 are pierced through the plates 67 and screwed with the fixed plates 70, so that the fixed plates 70, which are connected to the shaft 12b, are respectively fixed to the plates 67. The film plate 69 and the fixed plates 70 can be turn 90° about the shaft 12b, as shown by two-dot chain lines in FIG. 13A, by detaching the screws 78. The film feeding section 12 can be fixed at the turned position by attaching the screws 78 to the plates 67. While the film feeding section 25 is located at the turned position, the film collecting roller 12c, on which the used release film 10 has been collected, can be efficiently exchanged in a wide working space.

If the film collecting section 12 or the film feeding section 11 is capable of turning with respect to the press unit, a chase 8b (see FIG. 2) of the molding die 8 can be easily drawn outward without interfering other members.

As described above, the film feeding section 11 can be moved away from the press unit and drawn outward, so that the space for exchanging the film feeding roller 11c can be formed and the film feeding roller 11c can be efficiently exchanged therein. The film feeding section 11 can be drawn via the space, in which the loader 14 and the unloader 15 are moved, without interfering the rail sections, so that the resin molding machine can be compact in size. Since the film collecting section 12 can be turned about the shaft 12b, the working space can be formed and the film collecting roller 12c, on which the used release film 10 has been collected, can be easily exchanged therein.

The tension rollers 11d and 12d of the film feeding section 11 and the film collecting section 12 respectively have the sensors 11e and 12e so as to detects revolution numbers of the tension rollers 11d and 12d, and speed of the motors 42 and 43 are controlled on the basis of output signals of the sensors 11e and 12e. Therefore, the release film 10 can be stably supplied with fixed feeding length and fixed tension. Note that, the control can be executed by one of the sensors 11e and 12e.

The film feeding section 11 and the film collecting section 12 have the guide rollers 44 and 45 capable of moving the release film 10 to and away from the parting face, so that the release film 10 can be smoothly fed without damaging the release film 10. Therefore, the used release film 10 can be reused.

The film feeding section 11 and the film collecting section 12 may be inversely arranged with respect to the press unit. In this case, the film collecting section 12 may be moved beyond the rail sections, and the film feeding section 11 may be turned about a shaft.

A hinge may be provided to the attaching plate 48 or 66 instead of the shaft 12b, and the film feeding section 11 or the film collecting section 12 may be turned about the hinge. In FIG. 7A, for example, the hinge or hinges are provided to one or both ends of the attaching plate 66. With this structure, the film collecting roller 12c can be turned 90°.

In the present embodiment, the film feeding section 11 and the film collecting section 12 can be drawn or turned. Further, the both sections 11 and 12 may be drawn or turned, and the both sections 11 and 12 may be turned and drawn. In the present embodiment, the drawing direction is perpendicular to the rail sections, but it may diagonally cross the rail sections.

The film unit F may be employed in the resin molding machine, in which the work piece feeding unit A and the product accommodating unit B are integrated.

Sixth Embodiment

A sixth embodiment will be explained with reference to FIGS. 14–19. The feature of the sixth embodiment is a tablet feeding machine, which is attached to the resin molding machine. The structure of the resin molding machine is similar to that of the foregoing embodiments, so elements explained in the foregoing embodiments are assigned the same symbols and explanation will be omitted.

Firstly, an outline of the resin feeding section 5 will be explained. A tablet feeding unit 81 arranges and sends resin tablets t from a tablet container. The resin tablets t are set setting holes of the tablet holder 6 in order. The tablet holder 6, in which the resin tablets t are set, is transferred from a setting position Z1 to a transferring position Z2, at which the resin tablets t are transferred to the loader 14 (see FIG. 15). Note that, a plurality of the tablet holders 6 may be used and alternately and reciprocatively moved between the position Z1 and Z2.

Next, details of the tablet feeding unit 81 will be explained with reference to FIGS. 14–16. A plurality of the resin tablets t are introduced from a tablet stocker 83 to a hopper 82 via a hopper guide 82a. The hopper 82 is provided to an upper end of supporting rod 85, which is provided on a base 84. The hopper 82 is vibrated a predetermined time so as to supply a fixed amount of the resin tablets t from the hopper 82 to the tablet container. A tablet sending section 86 includes a first tablet container 87 and a first vibrating section 88; a tablet circulating section 89 includes a second tablet container 90 and a second vibrating section 91. The tablet sending section 86 is close to the tablet circulating section 89.

Figure 17:
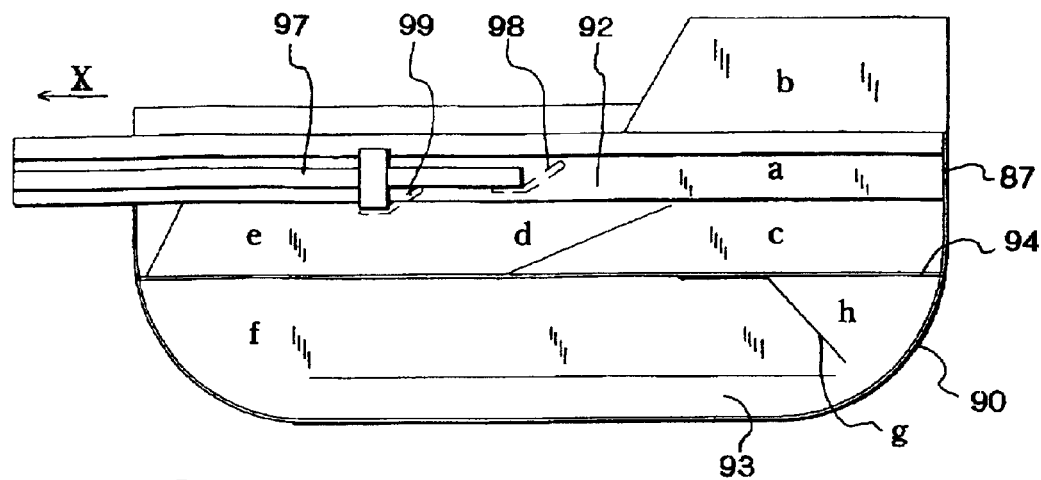
FIG. 17 is a plan view of a first and a second tablet containers.

A first guide section (a lower guide section) 92, whose sectional shape is like a half circle, is formed in a bottom part of the first tablet container 87. An upper guide section 97 is provided to correspond to the lower guide section 92. As shown in FIG. 17, the upper guide section 97 has a first check plate 98 and a second check plate 99, which introduce and drop the resin tablets t, which are not headed to the prescribed direction, into the second tablet container 90. Namely, the resin tablets t, which are supplied from the hopper 82 and guided along a first conveying face of the lower guide section 92, are formed in line and sent in a direction of an arrow X.

The first vibrating section 88 vibrates the first tablet container 87 so as to send the resin tablets t, along the lower guide 92, to the direction of the arrow X (see FIG. 15).

Figure 18:
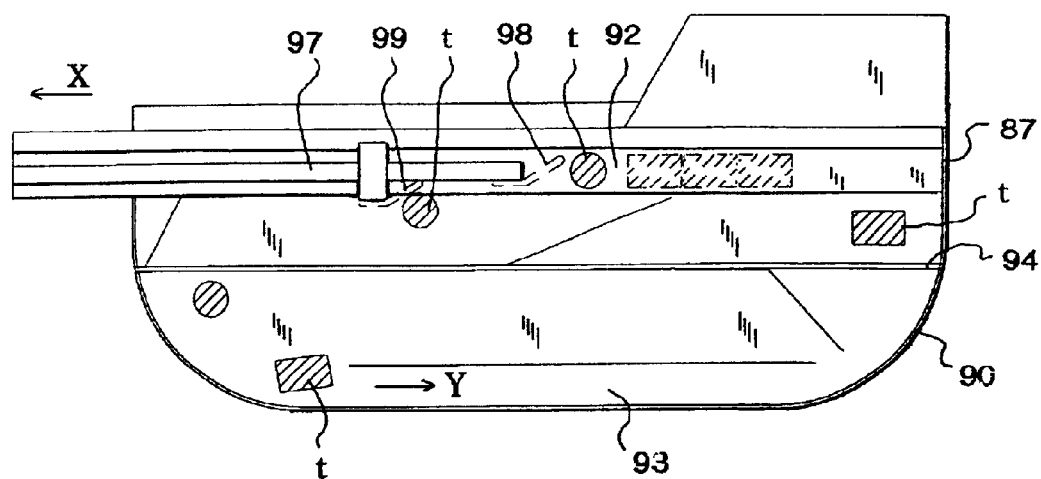
FIG. 18 is a plan view of the first and the second tablet containers, in which resin tablets are sent.

The second tablet container 90 accommodates many resin tablets t, which have been missed to send from the first tablet container 87 and collected. A second guide section (a groove) 93, which guides the resin tablets t in a direction Y, which is the opposite direction of a sending direction X shown in FIG. 18, is formed in a bottom part of the second tablet container 90.

Figure 19:
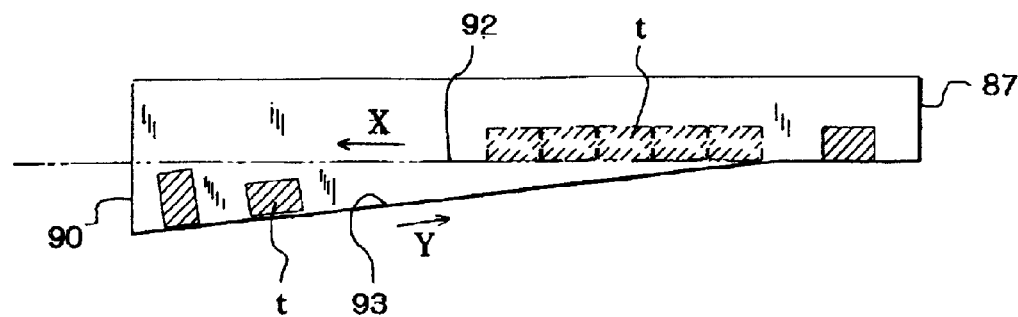
FIG. 19 is a sectional view of the first and the second tablet containers, in which resin tablets are sent.
Figure 20:
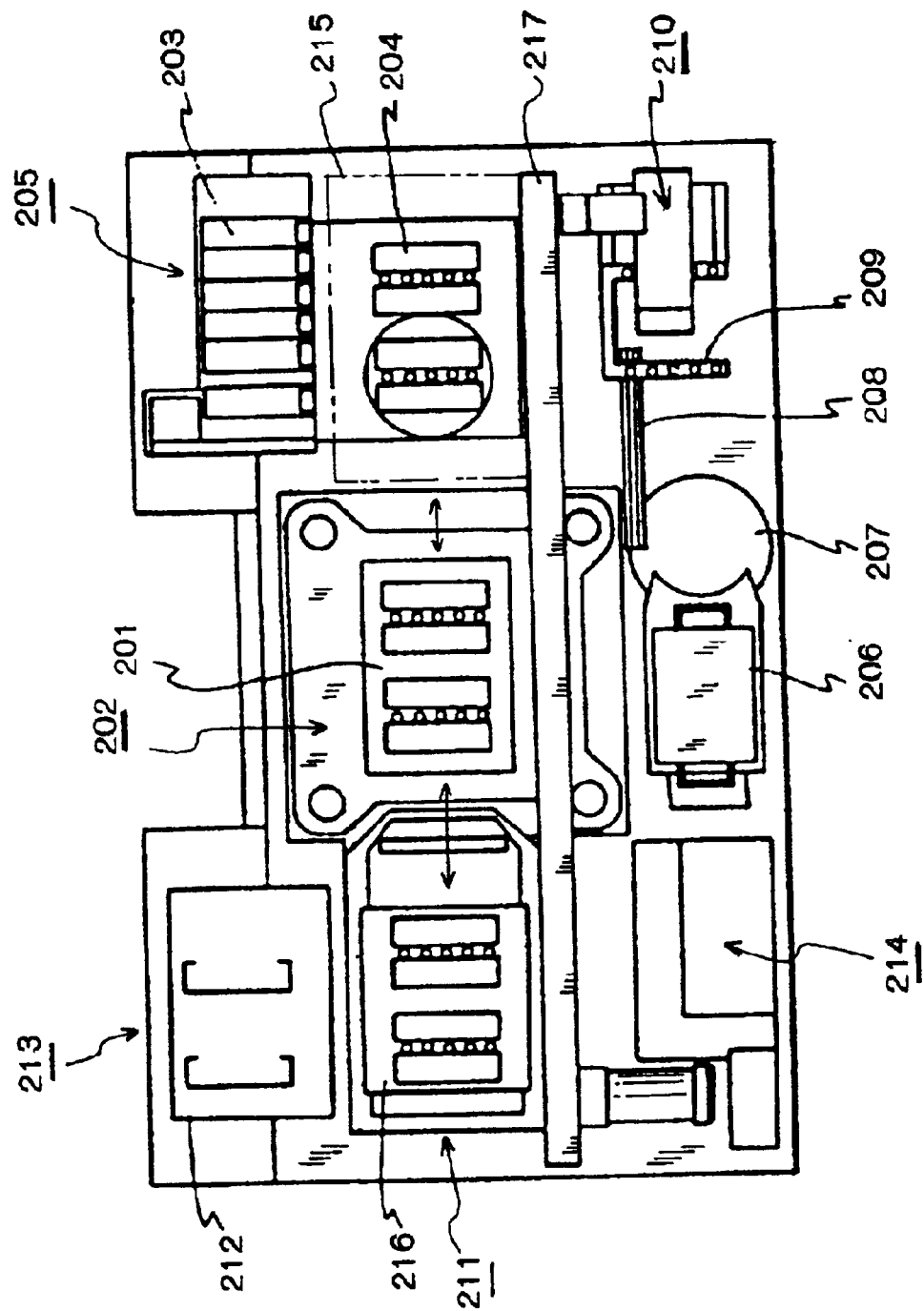
FIGS. 20 and 21 are views of a conventional resin molding machine for molding semiconductor devices.
Figure 21:
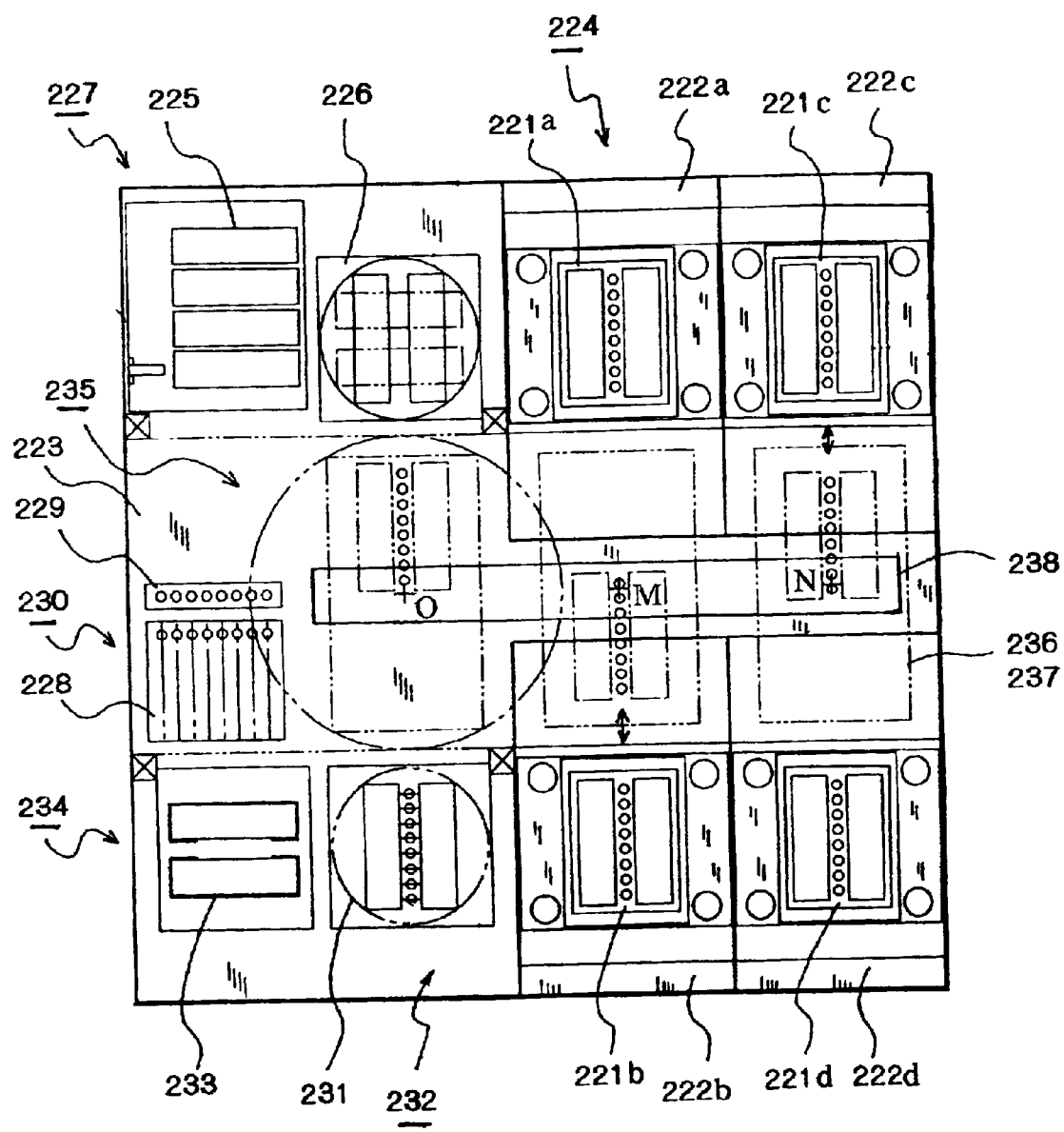
Figure 22:
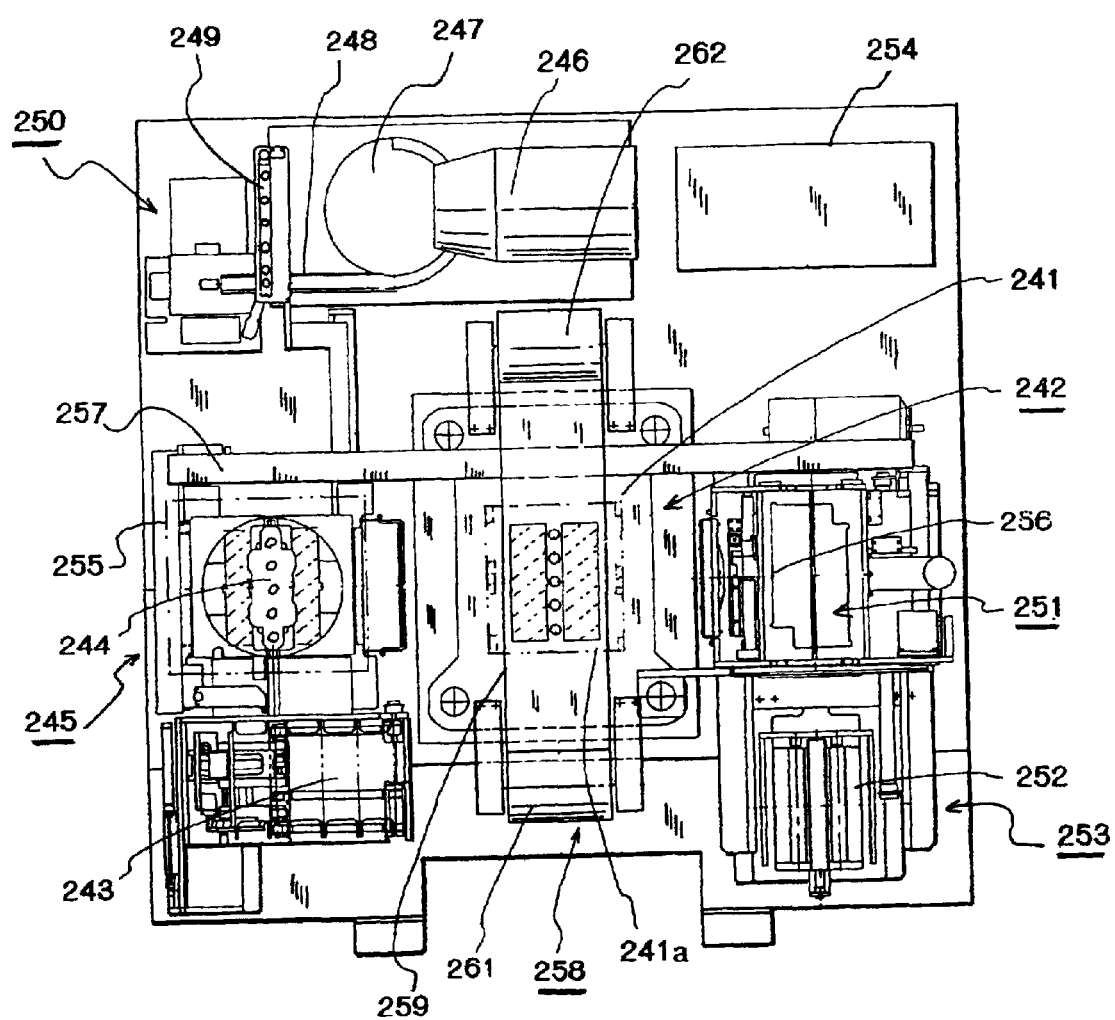
FIGS. 22 and 23 are views of a conventional resin molding machine having a film unit.
Figure 23:
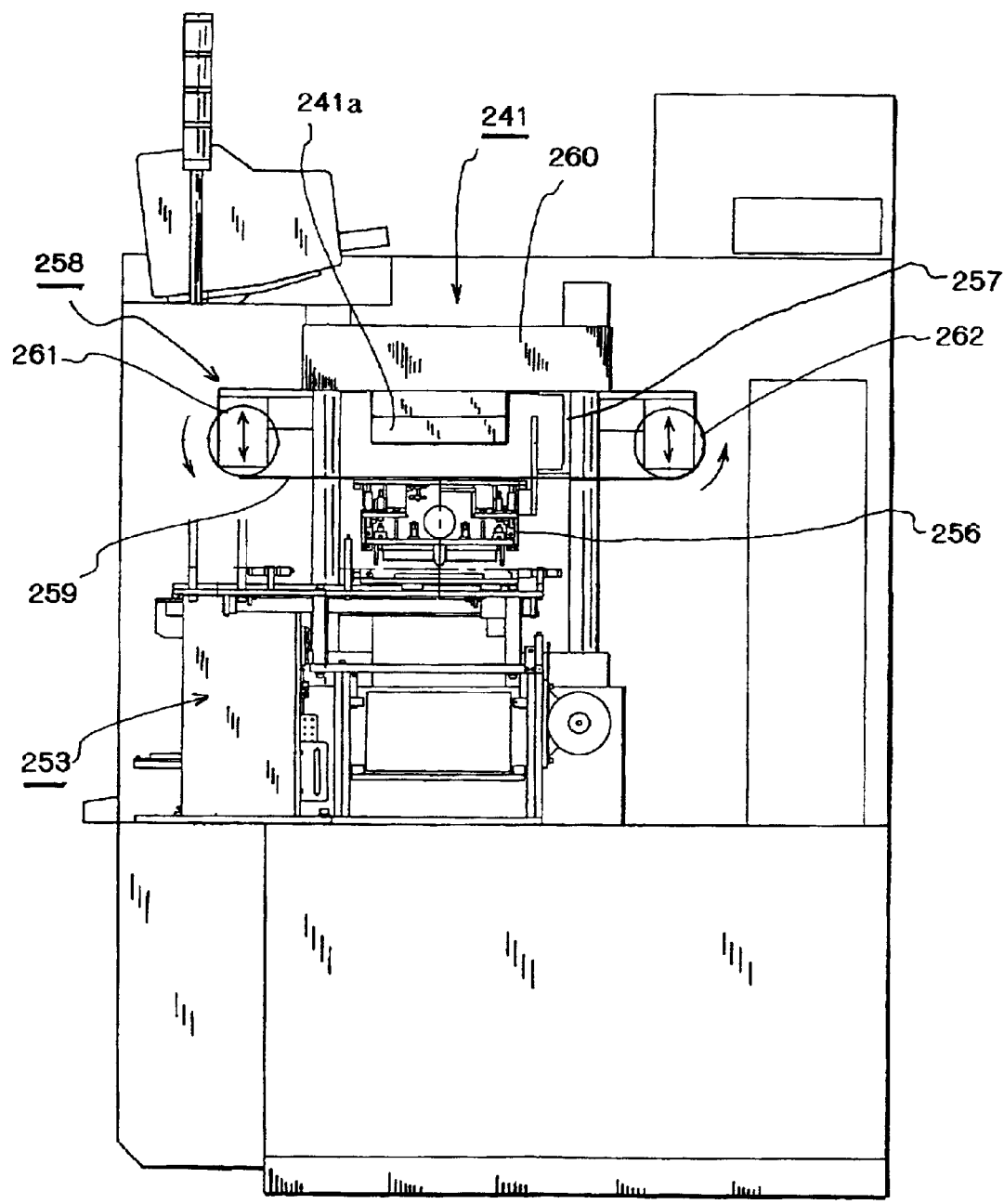

The second vibrating section 91 vibrates the second tablet container 90 so as to send the resin tablets t, in the direction Y, to the first tablet container 87 along a second conveying face 93 (see FIG. 19).

Figure 16:
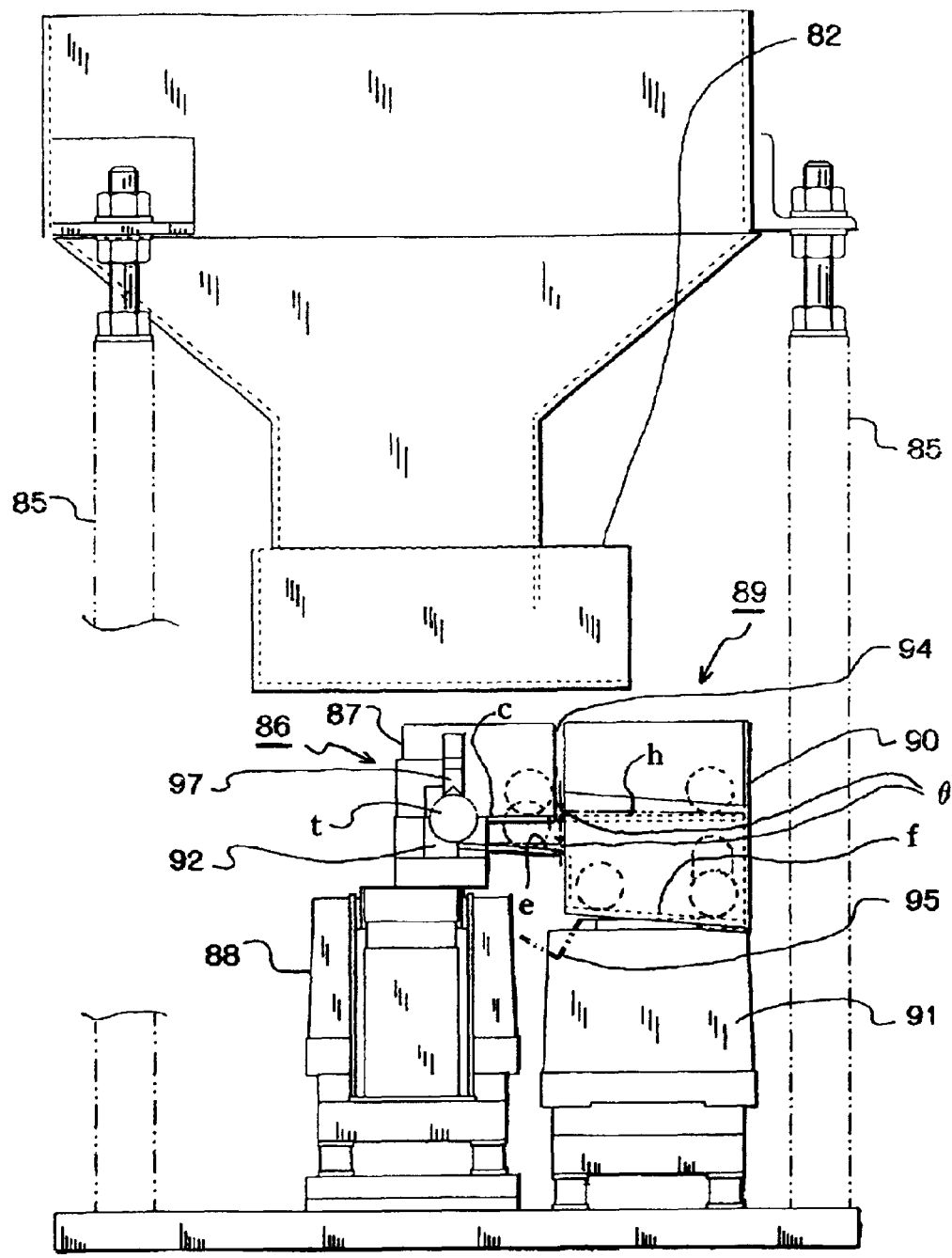
FIG. 16 is a side view of the tablet sending section seen from a direction of an arrow T shown in FIG. 14.

In FIGS. 15 and 16, the first vibrating section 88 and the second vibrating section 91 are linear feeders, whose vibrating directions are mutually opposite. The linear feeders 88 and 91 comprise leaf springs and pies elements so as to vibrate the first and the second tablet containers 87 and 90.

By combining the liner feeders 88 and 91 whose vibrating directions are mutually opposite, the first and the second tablet containers 87 and 90 can be easily synchronously vibrated, so that the resin tablets t can be smoothly circulated in a short time.

The first conveying face 92 of the first tablet container 87, on which the resin tablets t are sent, is horizontally arranged. The second conveying face 93 of the second tablet container 90, on which the resin tablets t are circulated, is arranged to cross the first conveying face 92 (see FIG. 19). With this structure, the resin tablets t, which are supplied from the hopper 82 and which can be sent to the resin molding machine, and the resin tablets t, which have to be circulated between the tablet containers, can be effectively classified.

A space 94 is formed between the first tablet container 87 and the second tablet container 90 (see FIG. 17), and a dust collecting section 95 is provided under the space 94. The resin tablets t are vibrated in the first tablet container 87 and the second tablet container 90, so they mutually collide each other and collide with inner faces of the containers. Resin dusts formed by the collision are fallen into the dust collecting section 95 and collected in a dust box 96 (see FIG. 16). Note that, as shown in FIGS. 1–5, the resin feeding unit 81 and the vacuum unit 17 may be connected by a duct 105 instead of the dust box 96, and the resin dusts fallen into the dust collecting section 95 may be collected by the vacuum unit 17. By providing the collecting duct 105 in the vicinity of the space 94, the resin dusts formed by the vibration can be effectively collected.

Details of the first tablet container 87 and the second tablet container 90 will be explained with reference to FIGS. 17–19. To clearly explain, symbols a-h are assigned to parts of the first tablet container 87 and the second tablet container 90, which have different height (see FIG. 17).

The height and the parts of the first tablet container 87 will be explained with reference to FIG. 17. The resin tablets t are supplied to the parts a-c. The first guide section 92 is formed in the part a. The parts b and c are inclined to the part a. Namely, the height of the part a is lower than that of the part b, and the height of the part a is lower than that of the part c. The height of the part d, which is near the first check plate 98, is lower than that of the part a. The height of the part c, which is near the second check plate 99, is lower than that of the part d.

As shown in FIG. 17, the space 94 is formed between the first tablet container 87 and the second tablet container 90. The height and the parts of the second tablet container 90 will be explained. The part f, which is connected to the collecting part e, is the lowest part. The part h, which is connected to the step part g, is the highest part. The second guide section 93 is formed from the part f to the part h. The resin tablets t are introduced, in the direction Y. The resin tablets t are sent to the part c via the part h, whose height is equal to or higher than that of the part c, then fallen into the area a. The resin tablets t fallen in the part a will be recirculated.

Next, the travel of the resin tablets t will be explained. In FIG. 17, the resin tablets t are supplied in the part c of the first tablet container 87 via the hopper 82. The resin tablets t falls into the part a and sent, by the first vibrating section 88, in the direction X along the first guide section 92. On the other hand, the resin tablets t, which have not guided by the first guide section 92, are introduced into the part f of the second tablet container 90, by the first and the second check plates 98 and 99, via the part e (see FIGS. 16 and 18). Then, as shown in FIG. 19, the resin tablets t are vibrated by the second vibrating section 91 and guided, in the direction Y, by the second guide section 93, so that they are returned to the part h. Further, the resin tablets t falls into the part a via the part c (see FIG. 18), then they are guided by the first guide section 92 and sent again (see FIG. 16). Note that, the resin dusts formed in the first tablet container 87 and the second tablet container 90 are introduced, by the vibration of the containers 87 and 90, into the space 94 via the parts e and h, which are inclined with angle θ to the horizontal plane (see FIG. 16), so that the resin dusts fall into the dust box 96 of the dust collecting section 95. Therefore, the resin dusts are not scattered in the containers 87 and 90.

The resin tablets t, which have been supplied via the hopper 82, are formed in line and linearly sent in the first tablet container 87. The resin tablets t not sent are linearly moved, in the second tablet container 90, to the first tablet container 90. With this structure, the resin tablets t can be supplied and formed in line in a short area, so that speed of feeding the resin tablets t can be accelerated. Further, forming the resin dusts can be reduced.

If the first guide section 92 of the first tablet container 87, which sends the resin tablets t, and the second guide section 93 of the second tablet container 90, which circulates the resin tablets t, are crossed, the resin tablets t, which can be sent to the resin molding machine, and the resin tablets t, which have to be circulated, can be effectively classified.

In the present embodiment, the vibrating directions of the first vibrating section 88 and the second vibrating section 91 are mutually opposite, so the first and the second tablet containers 87 and 90 can be easily synchronously vibrated. With this structure, the resin tablets t can be smoothly circulated in a short time. Further, an installing area of the resin feeding machine and manufacturing cost thereof can be reduced.

The space 94 is formed between the first tablet container 87 and the second tablet container 90, and the dust collecting section 95 is provided under the space 94. Therefore, the resin dusts formed by the vibration for circulating the resin tablets t can be effectively collected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A resin molding machine, comprising:
    a loader for conveying a work piece from a work piece feeding unit to a press unit in which the work piece is molded with resin;
    an unloader for taking out a molded product from said press unit and conveying the same to a product accommodating unit;
    a common rail section, on which said loader and said unloader move so as to convey the work piece and the molded product; and
    an additional rail unit having a rail section on which said loader and said unloader move, said additional rail unit being detachably attached between said work piece feeding unit and said product accommodating unit to connect the rail section of said additional rail unit with said common rail section;
    said loader moves, on said common rail section, between said work piece feeding unit and said additional rail unit having the press unit; and
    said unloader moves, on said common rail section, between said additional rail unit having the press unit and said product accommodating unit having a degating section.

2. The resin molding machine according to claim 1, wherein each of said work piece feeding unit and said product accommodating unit has the common rail section and a base section.

3. The resin molding machine according to claim 1, wherein said work piece feeding unit and said product accommodating unit are connected by said additional rail unit having sucking ducts and duct connecting sections, and
    the duct connecting section of one of said additional rail units is connected with the duct connecting section of the adjacent additional rail unit so as to connect the sucking ducts to each other.

4. The resin molding machine according to claim 1, wherein said additional rail unit has a base section, which includes a rail base supporting the rail section and a support base supporting a functional section.

5. The resin molding machine according to claim 1, wherein at least one of said work piece feeding unit, said product accommodating unit and said additional rail unit includes said press unit.

6. The resin molding machine according to claim 5, wherein at least one of said press unit has a film unit.

7. The resin molding machine according to claim 1, wherein a functional section in which a function other than a molding function is executed, is provided at a position of said press unit.

8. The resin molding machine according to claim 1, wherein a resin feeding section, which feeds resin for molding to said press unit, is provided to one of said work piece feeding unit, said product accommodating unit and said additional rail unit.

9. The resin molding machine according to claim 1, wherein an intermediate die feeding section, which attaches an intermediate die to and detaches the same from a place between an upper die and a lower die of said press unit, is provided to one of said work piece feeding unit, said product accommodating unit and said additional rail unit.

10. The resin molding machine according to claim 1, wherein a heat sink feeding section, which feeds a heat sink to said press unit, is provided to one of said work piece feeding unit, said product accommodating unit and said additional rail unit.

11. A resin molding machine, comprising:
    a loader for conveying the work piece and resin for molding from said work piece feeding unit to said press unit, in which the work piece is molded with the resin; and
    an unloader for conveying a molded product from said press unit to a product accommodating unit;
    said loader and said unloader move in a part of said press unit;
    one of a film feeding section, which feeds release film onto a parting face of said press unit, and a film collecting section, which collects used release film can be moved away from said press unit so as to exchange the release film.

12. The resin molding machine according to claim 11, wherein one of said film feeding section and said film collecting section can be horizontally drawn outward from said press unit.

13. The resin molding machine according to claim 12, wherein one of said film feeding section and said film collecting section can be pivoted to move away from said press unit.

14. The resin molding machine according to claim 11, wherein said film feeding section includes: a film feeding roller, on which the release film is wound; and a tension roller capable of giving tension to the release film drawn from the film feeding roller, and said film collecting section includes: a film collecting roller which winds the release film used; and a tension roller capable of giving tension to the release film collected by the film collecting roller.

15. The resin molding machine according to claim 11, wherein the tension rollers of said film feeding section and said film collecting section respectively have sensors, which respectively detects revolution numbers of the tension rollers, and revolution numbers of driving sources, which respectively rotate the tension rollers, are controlled on the basis of output signals of the sensors.

16. The resin molding machine according to claim 11, wherein said film feeding section and said film collecting section respectively have guide rollers for moving the release film away from the parting face of said press unit.

17. The resin molding machine according to claim 1, wherein said work piece feeding unit has a resin tablet feeding section comprising:

a tablet sending section including a first tablet container, which forms resin tablets in line and guides them in a sending direction, and a first vibrating section, which vibrates the first tablet container so as to send the resin tablets; and a tablet circulating section including a second tablet container, which accommodates the resin tablets which have been missed to send from the first tablet container and collected, and a second vibrating section, which vibrates the second tablet container so as to send the resin tablets to the first tablet container.

18. The resin molding machine according to claim 11, wherein said work piece feeding unit has a resin tablet feeding section comprising:

a tablet sending section including a first tablet container, which forms resin tablets in line and guides them in a sending direction, and a first vibrating section, which vibrates the first tablet container so as to send the resin tablets; and a tablet circulating section including a second tablet container, which accommodates the resin tablets which have been missed to send from the first tablet container and collected, and a second vibrating section, which vibrates the second tablet container so as to send the resin tablets to the first tablet container.

* * * * *